(12) United States Patent
Deoalikar et al.

(10) Patent No.: US 8,052,055 B2
(45) Date of Patent: Nov. 8, 2011

(54) METHOD AND SYSTEM FOR PERTURBING MULTI-RADIO-FREQUENCY-IDENTIFICATION-TAG-READER NETWORKS TO INCREASE INTERROGATION EFFICIENCY

(75) Inventors: Vinay Deoalikar, Mountain View, CA (US); John Recker, Mountain View, CA (US); Malena Mesarina, San Francisco, CA (US); Salil Pradhan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1272 days.

(21) Appl. No.: 11/701,225

(22) Filed: Jan. 31, 2007

(65) Prior Publication Data
US 2008/0180247 A1   Jul. 31, 2008

(51) Int. Cl.
*G06K 19/06* (2006.01)

(52) U.S. Cl. ......................................... 235/451; 235/441

(58) Field of Classification Search .................. 235/451, 235/441, 380, 384, 485, 486; 340/10.1–10.6, 340/572.1–572.9, 825
See application file for complete search history.

(56) References Cited

U.S. PATENT DOCUMENTS

| | | | |
|---|---|---|---|
| 7,324,015 B1 * | 1/2008 | Allen et al. | 340/933 |
| 7,614,555 B2 * | 11/2009 | Sullivan et al. | 235/451 |
| 7,672,260 B2 * | 3/2010 | Wood, Jr. | 370/312 |
| 7,717,346 B2 * | 5/2010 | Smets et al. | 235/486 |
| 2006/0022815 A1 * | 2/2006 | Fischer et al. | 340/505 |

* cited by examiner

*Primary Examiner* — Daniel St. Cyr

(57) ABSTRACT

Methods and systems of the present invention employ perturbation techniques for configuring RFID-tag-reader networks in order to achieve increased overall efficiency of a network of RFID-tag readers. According to described embodiments of the present invention, individual RFID-tag readers within a multi-RFID-tag-reader network may be removed or shut down, or RFID-tag readers may be displaced relative to one another, in order to remove interferences between RFID-tag readers and to increase the interrogation efficiency of the multi-RFID-tag-reader network.

20 Claims, 43 Drawing Sheets

$\beta_0(G) = 3$ $\chi(G) = 3 = \min k$
for which $V = \bigcup V_i$
$i = 1$ to $k$
and each $V_i$ is independent $\omega(\bar{G}) = \beta_0(G) = 3$

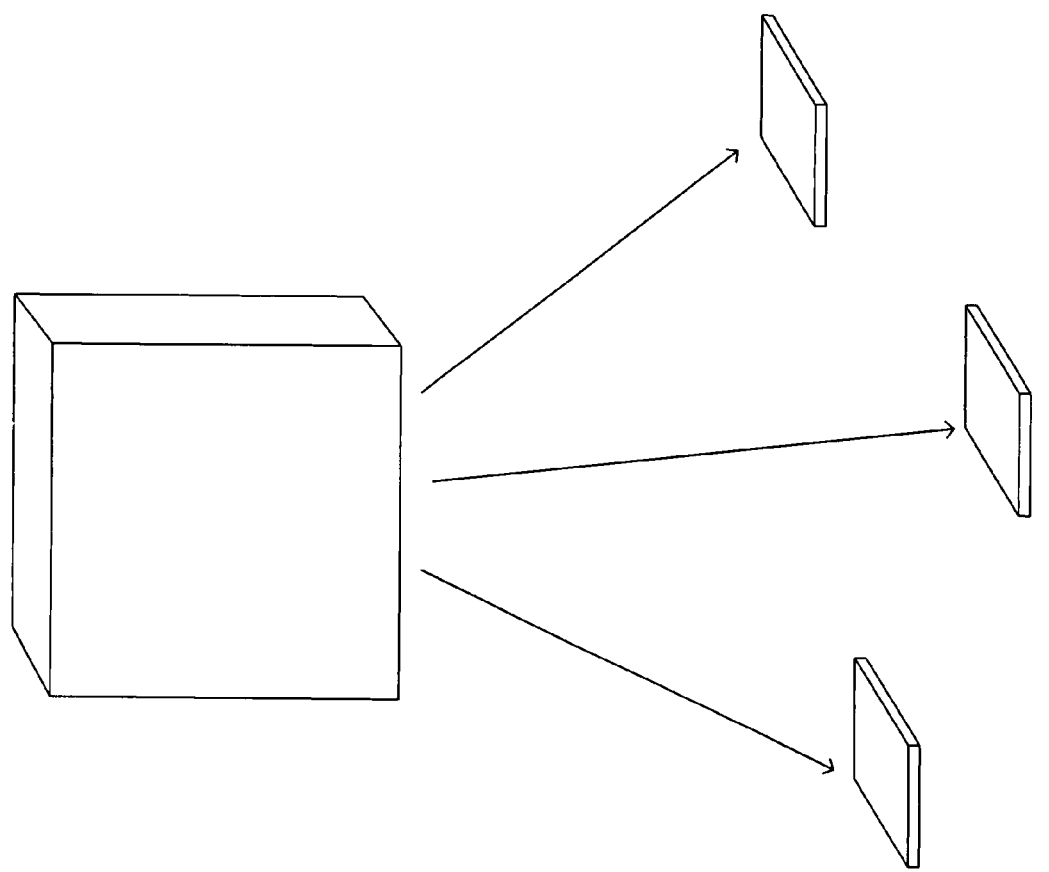

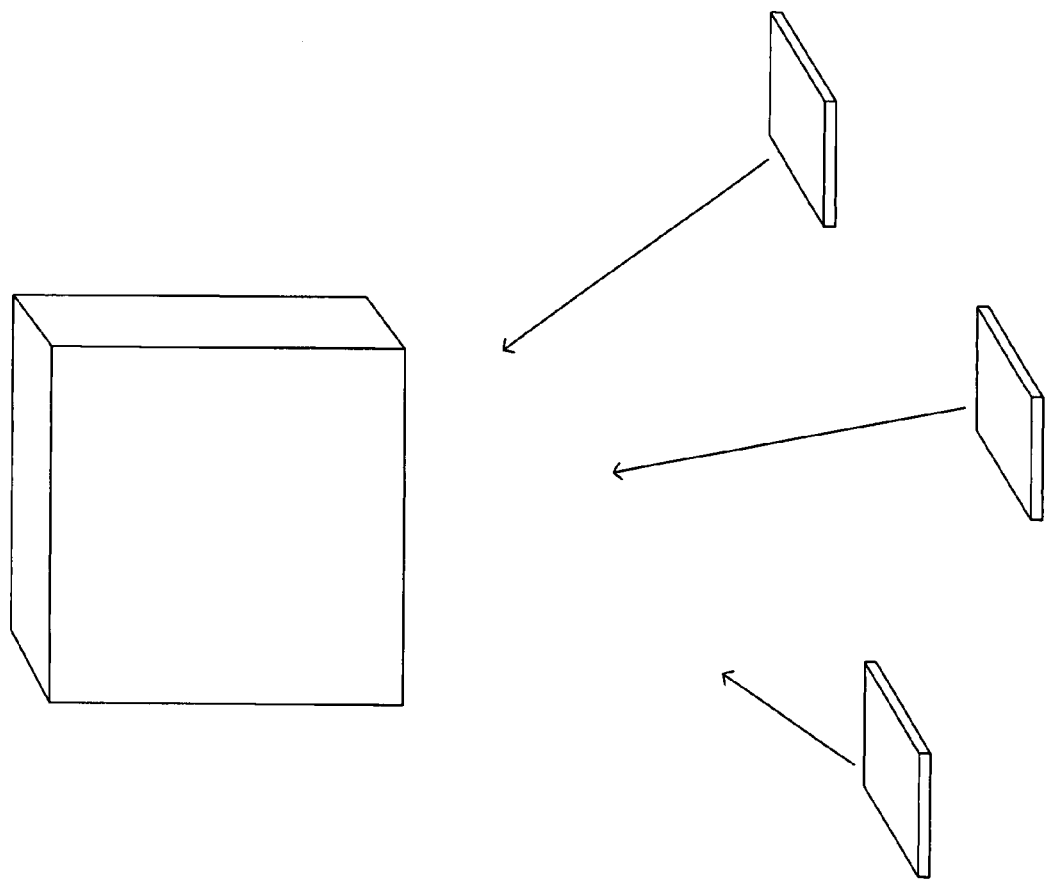

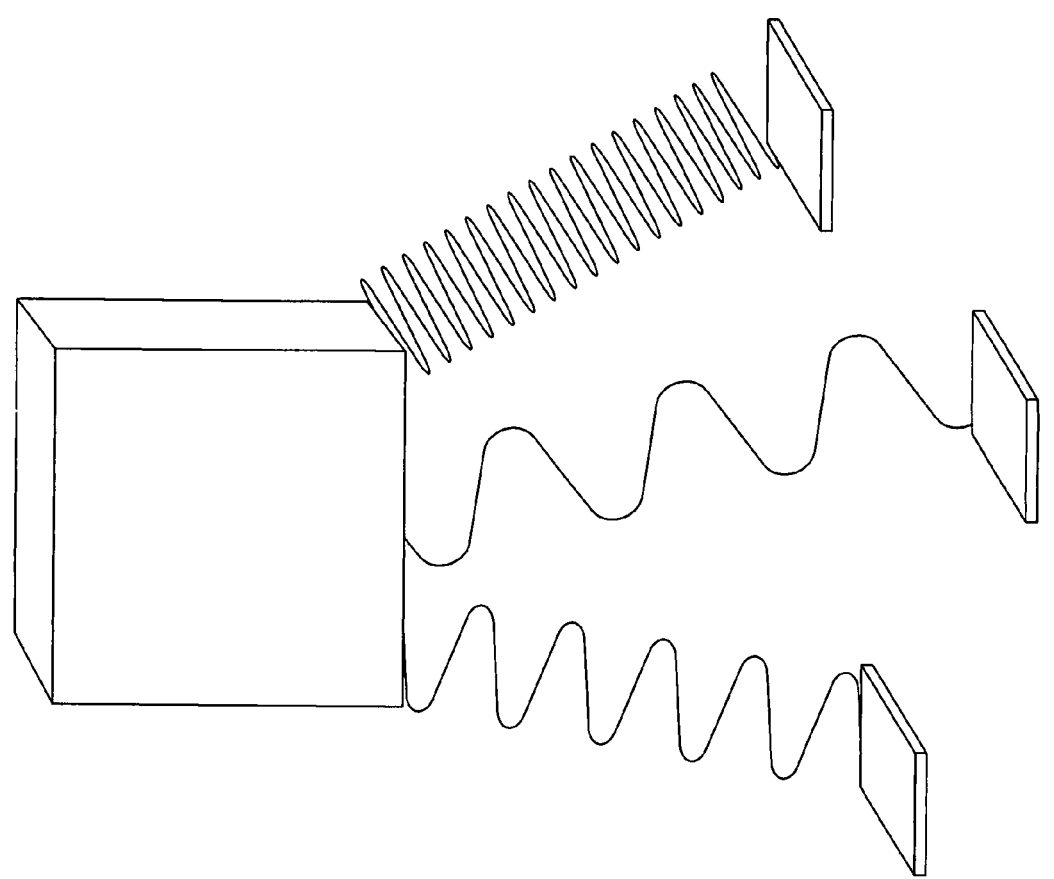

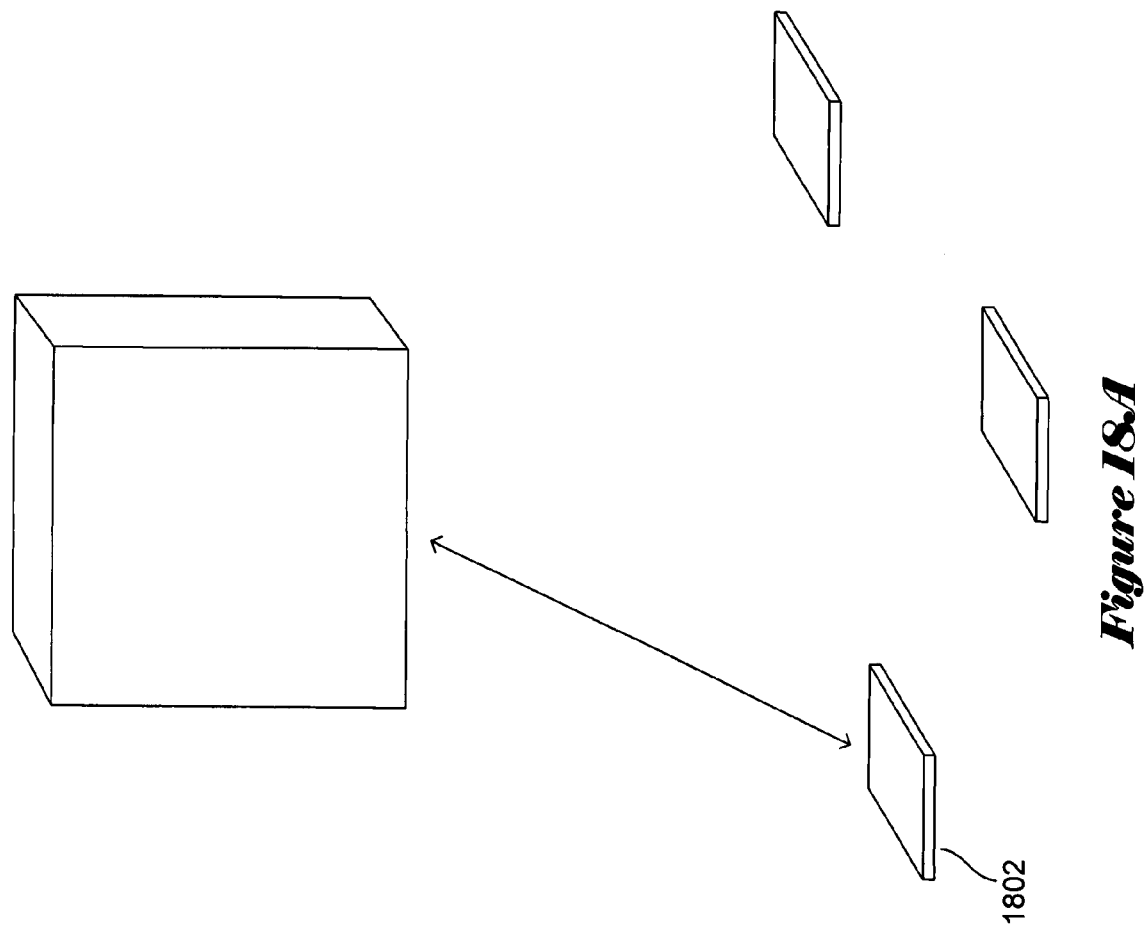

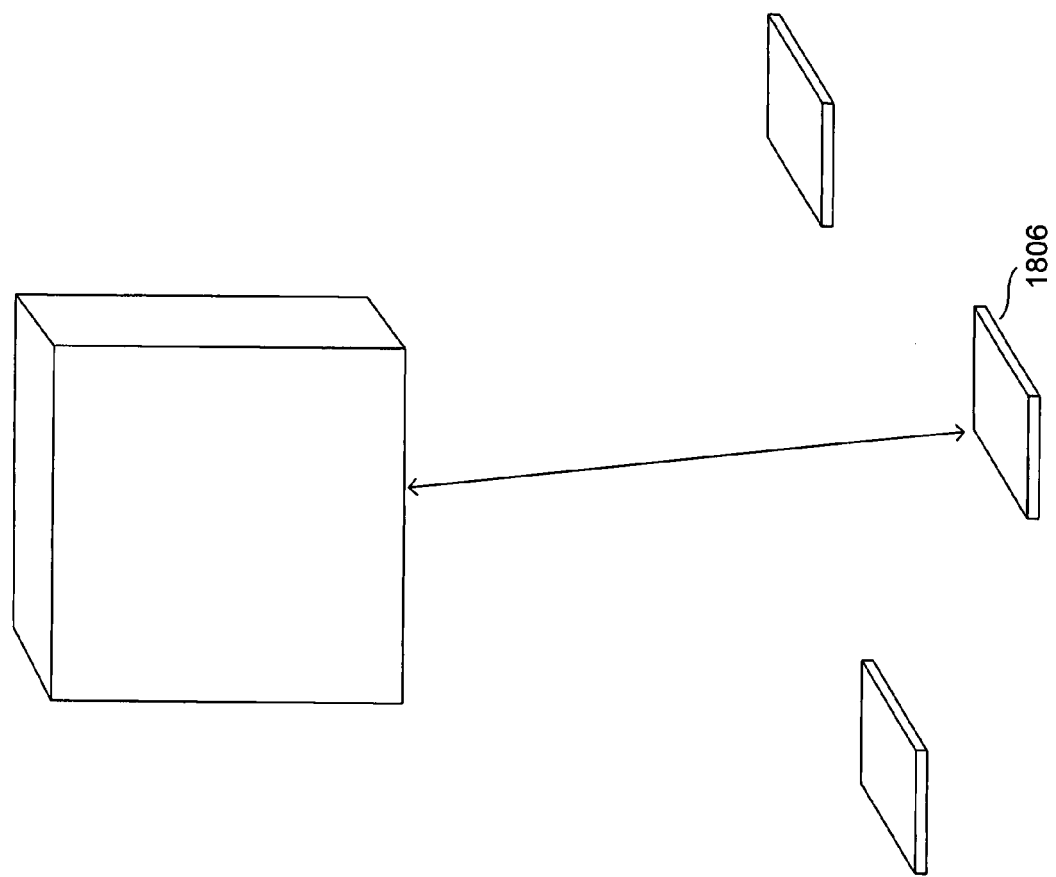

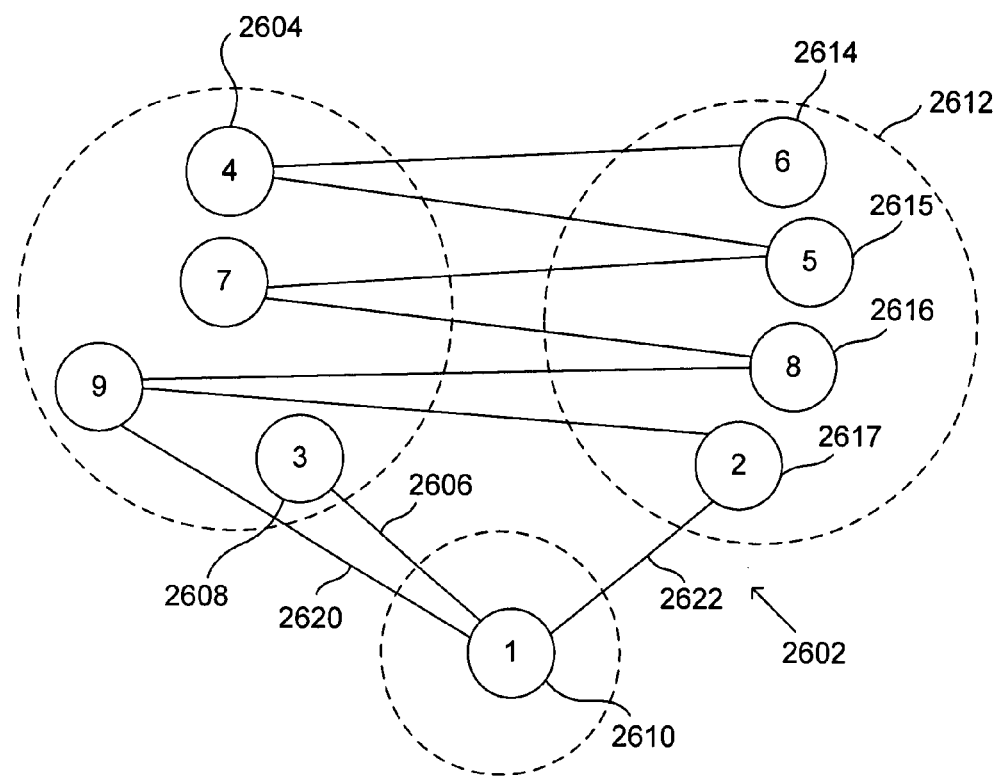
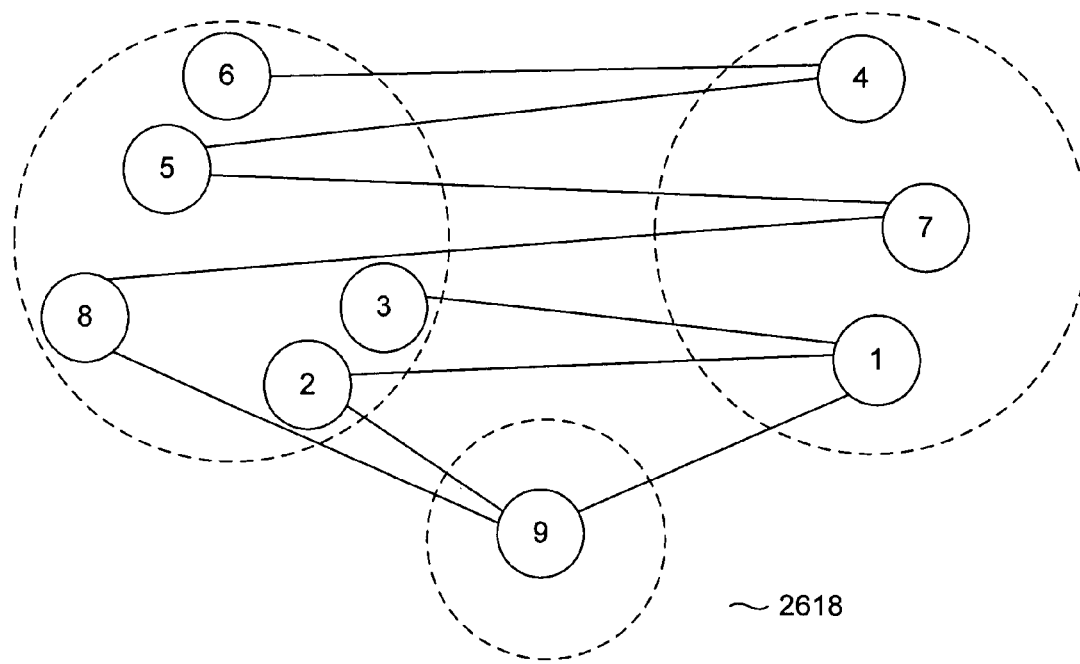
*Figure 26*

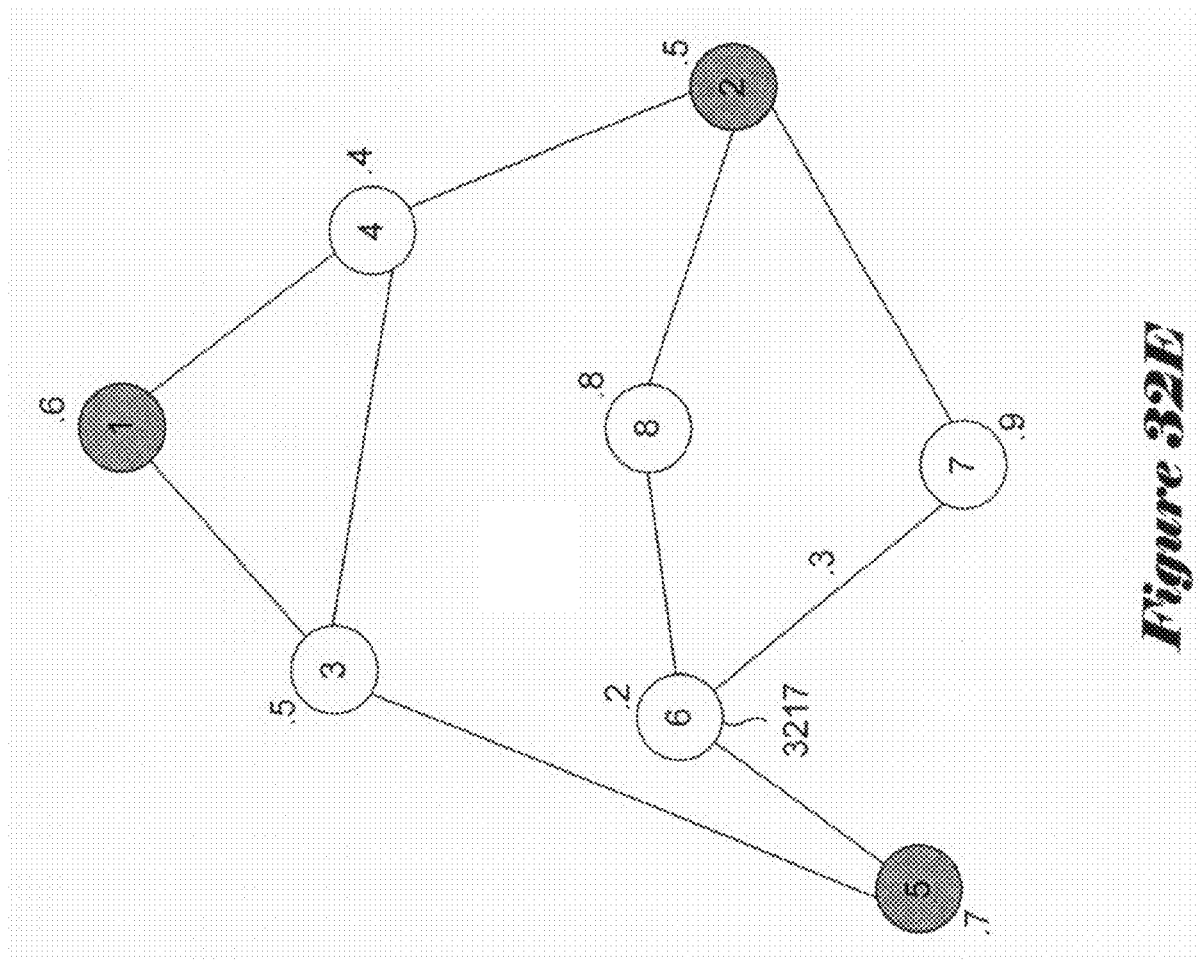

METHOD AND SYSTEM FOR PERTURBING MULTI-RADIO-FREQUENCY-IDENTIFICATION-TAG-READER NETWORKS TO INCREASE INTERROGATION EFFICIENCY

TECHNICAL FIELD

Methods and systems of the present invention are related to analysis and configuration of multi-radio-frequency-identification-tag reader networks and, in particular, to methods and systems for increasing the efficiency of a multi-radio-frequency-identification-tag reader networks by altering the multi-radio-frequency-identification reader networks.

BACKGROUND OF THE INVENTION

A large research and development effort has been directed to radio frequency identification ("RFID") technologies during the past ten years. As a result of these efforts, and as a result of their utility and economy, RFID tags and RFID-tag readers have found widespread, commercial application in a variety of disparate fields, from identification of pets to inventory management and inventory control. As discussed in the following sections, techniques have been developed to allow an RFID reader to interrogate, or read the contents of, multiple RFID tags within the RFID-tag reader's physical range of interrogation, or field. Despite advances in this area, however, the efficiency of an RFID-tag reader may be, in certain applications, significantly less than a desirable or needed efficiency, and significantly less than the RFID-tag reader's theoretical maximum efficiency under optimal conditions. Less research and development effort has been devoted to reading of RFID tags by multiple, interfering RFID-tag readers. In many applications, mutually interfering RFID-tag readers severely constrain, or even completely prohibit, effective interrogation of RFID tags by the mutually interfering RFID-tag readers, leading to low efficiency of multi-RFID-tag-reader networks that include mutually interfering RFID-tag readers. For these reasons, RFID researchers and developers, as well as manufacturers, vendors, and users of RFID tags and RFID-tag systems, have recognized the need for methods for improving the efficiencies of multi-RFID-tag-reader networks that include two or more mutually interfering RFID-tag readers.

SUMMARY OF THE INVENTION

Methods and systems of the present invention employ perturbation techniques for configuring RFID-tag-reader networks in order to achieve increased overall efficiency of a network of RFID-tag readers. According to described embodiments of the present invention, individual RFID-tag readers within a multi-RFID-tag-reader network may be removed or shut down, or RFID-tag readers may be displaced relative to one another, in order to remove interferences between RFID-tag readers and to increase the interrogation efficiency of the multi-RFID-tag-reader network.

BRIEF DESCRIPTION OF THE DRAWINGS

FIG. 15 shows the RFID-tag reader transmitting an RF carrier signal that is received by the multiple RFID tags within its range.

FIG. 16 shows the multiple RFID tags attempting to respond simultaneously to the detected RF carrier signal.

FIG. 17 shows the RFID-tag reader emitting multiple different RF carrier signals with different frequencies.

FIGS. 18A-C illustrate one time-based multiplexing technique that employs a collision-avoidance technique.

FIG. 26 illustrates two different collision-graph representations of the multi-RFID-tag-reader network shown in FIGS. 21 and 24-25.

FIG. 28 illustrates a first period in a cycle of power-on/power-off operations of the interrogation strategy in which RFID-tag readers of an independent subgroup are powered-on.

FIG. 29 illustrates a second period in a cycle of power-on/power-off operations of an interrogation strategy in which RFID-tag readers of a second independent subgroup are powered-on.

FIGS. 32A-32F illustrate general perturbation-selection methods that represent embodiments of the present invention.

DETAILED DESCRIPTION OF THE INVENTION

Methods and systems of the present invention employ perturbation techniques to increase the efficiencies of multi-RFID-tag-reader networks. RFID-tag-reader networks are modeled by collision graphs, in described embodiments of the present invention, and the collision graphs are analyzed and modified by techniques based on graph theory to produce models of potentially more efficient RFID-tag-reader networks. In a first subsection, various aspects of graph theory are provided as a foundation for descriptions of embodiments of the present invention. In a second subsection, an exemplary multi-RFID-tag-reader network is described, followed by descriptions of method embodiments of the present invention. In a third subsection, a C++-like pseudocode implementation of one embodiment of the present invention is provided.

Brief Overview of Relevant Aspects of Graph Theory

Figure 1:
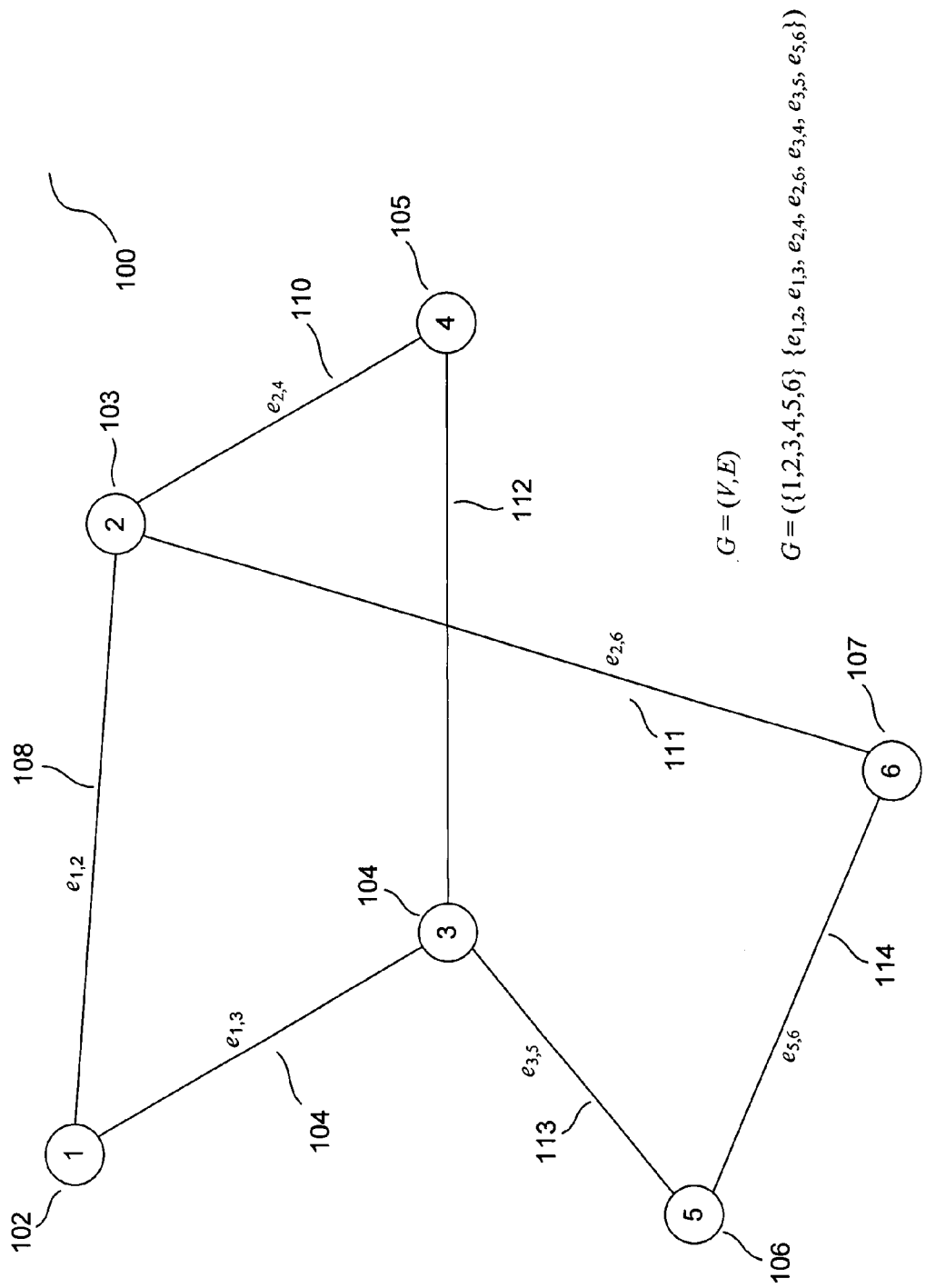
FIG. 1 illustrates a simple, undirected graph G.

FIG. 1 illustrates a simple, undirected graph G. The graph G 100 comprises includes nodes 102-107 that together compose a set of nodes V and edges 108-114 that together compose a set of edges E. In the graph G shown in FIG. 1, the nodes, or vertices, are shown as circles with numerical labels 1-6, and the edges are each labeled as $e_{x,y}$, where x and y are the numerical labels of the vertices directly connected by the edge. Mathematically, a graph G is represented as:

$$G = (V, E)$$

where V is the set of vertices and E is the set of edges. For the graph shown in FIG. 1, the graph can be explicitly defined as:

$$G = (\{1,2,3,4,5,6\}, \{e_{1,2}, e_{1,3}, e_{2,4}, e_{2,6}, e_{3,4}, e_{3,5}, e_{5,6}\})$$

Figure 2:
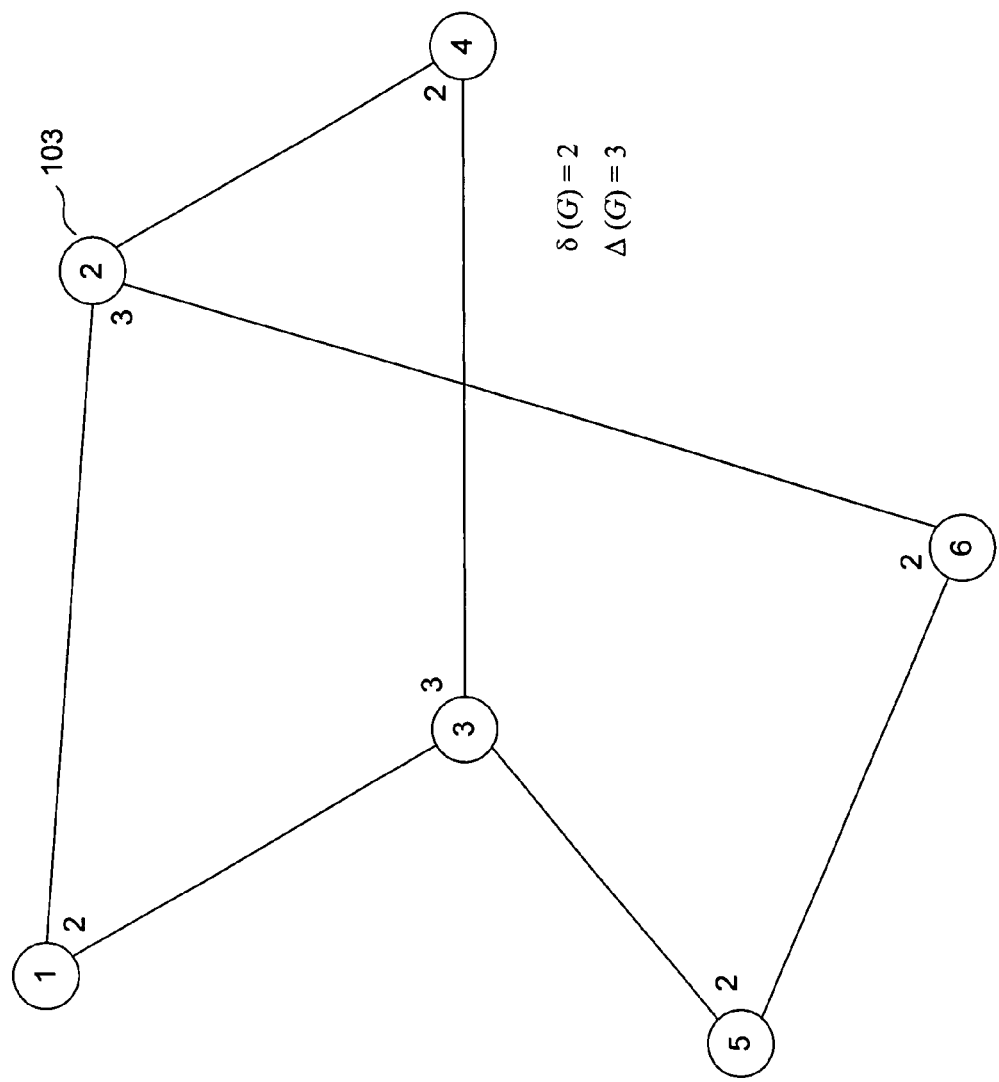
FIGS. 2-4 illustrate various characteristics of graphs using the graph G shown in FIG. 1.
Figure 3:
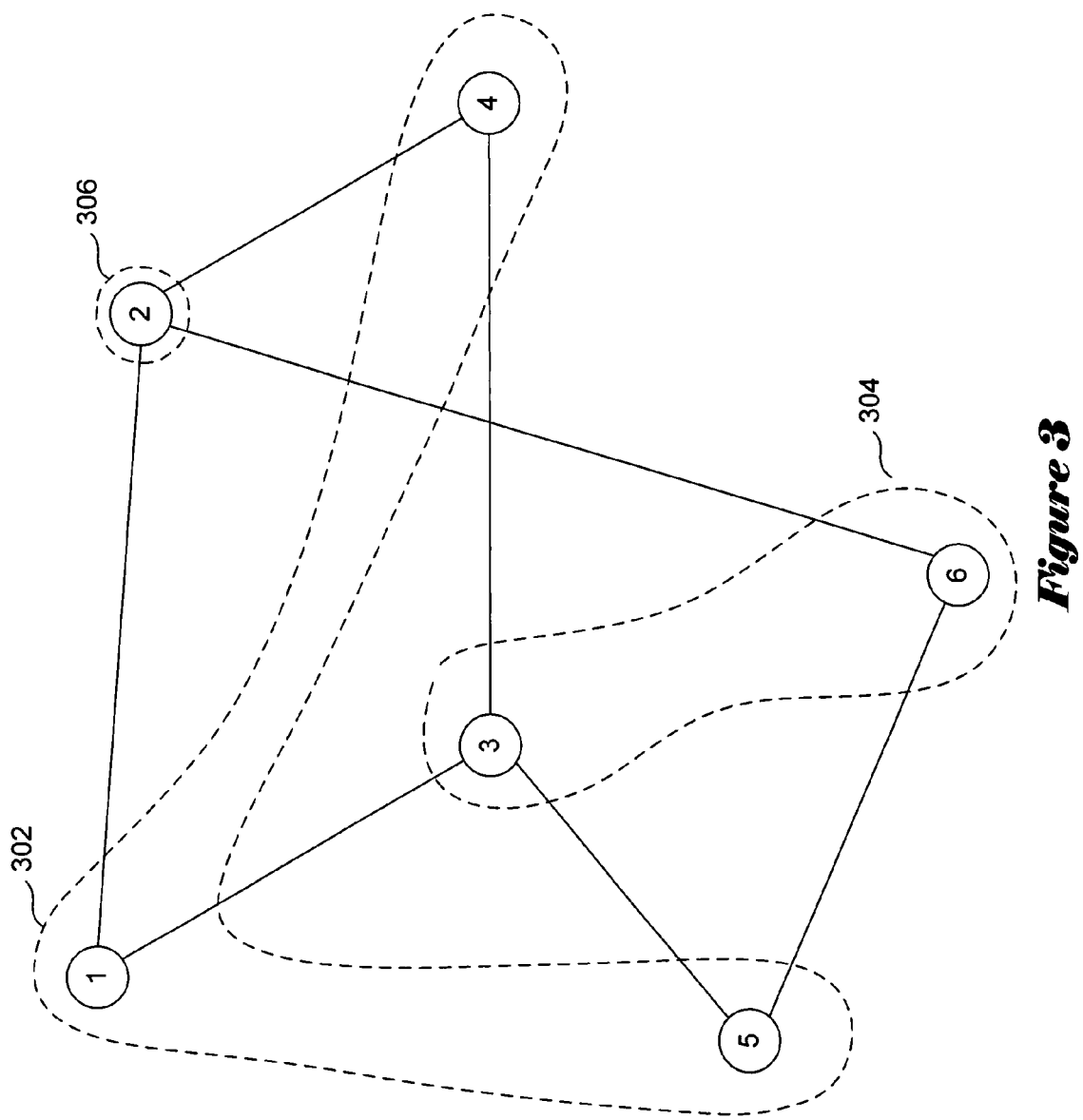
Figure 4:
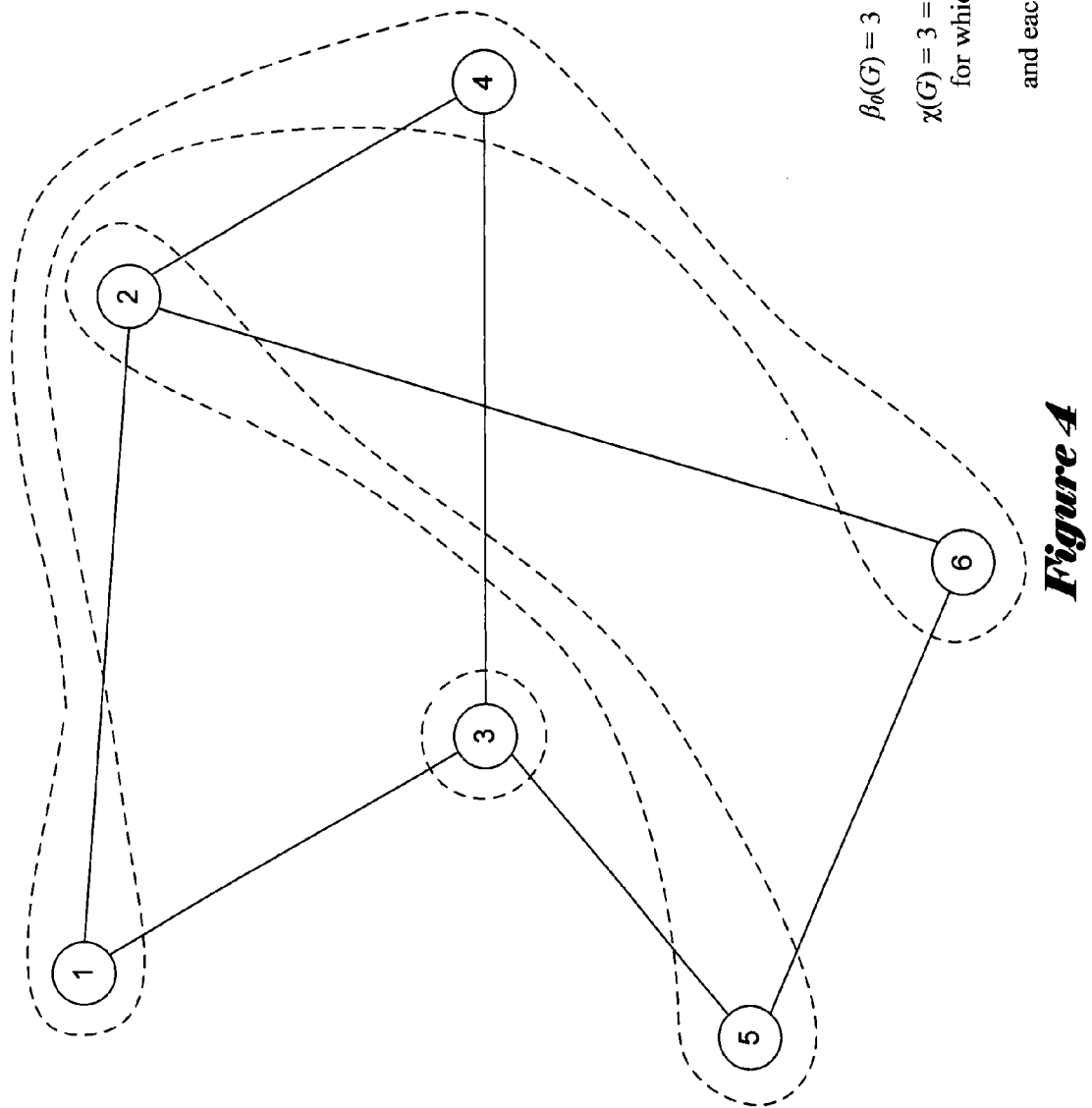

FIGS. 2-4 illustrate various characteristics of graphs using the graph G shown in FIG. 1. The degree of a vertex is the number of edges emanating from the vertex. In FIG. 2, each vertex of the graph G is labeled with the degree of the vertex. For example, the degree of vertex 2 103 is three. The minimum degree of any of the vertices in graph G, denoted as $\delta(G)$, is two, and the maximum degree of any of the vertices in G, designated $\Delta(G)$, is three.

An independent subset of V is a subset of vertices of a graph, each of which is not connected to other vertices of the subset by an edge. FIG. 3 shows the vertices of the graph G grouped into three independent subsets, indicated in FIG. 3 by dashed lines. One independent subset 302 includes the vertices 1, 4, and 5. A second independent subset 304 includes the vertices 3 and 6, and a third independent subset of vertices 306 includes the single vertex 2. In general, the vertices of a graph may be partitioned into many different independent subsets. For example, FIG. 4 shows a different partitioning of the vertices of graph G into three independent subsets. The size of the largest independent subset of vertices in graph G, or, in other words, the cardinality of the largest independent subset of vertices in graph G, is denoted as $\beta_0(G)$. The maximum size of any independent subset of vertices in the graph G shown in FIGS. 1-4 is three. Adding another vertex, or node, to any independent subset of vertices of cardinality 3 in graph G produces a subset with at least two nodes connected by an edge.

A graph is referred to as k-partite when the vertices of the graph can be partitioned into k independent subsets of vertices. Graph G shown in FIGS. 1-4 can be trivially seen to be 6-partite, since each of the six vertices can be assigned to a different, independent subset of vertices each including a single vertex. Graph G is also 5-partite, 4-partite, and 3-partite, but the vertices of graph G cannot be partitioned into only two independent subsets of vertices, and is therefore not bipartite. The minimum k for which $$V = \bigcup_{i=1 \text{ to } k} V_i,$$

where each $V_i$ is an independent set of vertices of the set of vertices V of a graph, is referred to as the chromatic number of the graph, denoted, for graph G, $\chi(G)$. The chromatic number is the minimum number of colors that can be used to color the vertices of a graph so that no two vertices with the same color are joined by a single edge.

Figure 5:
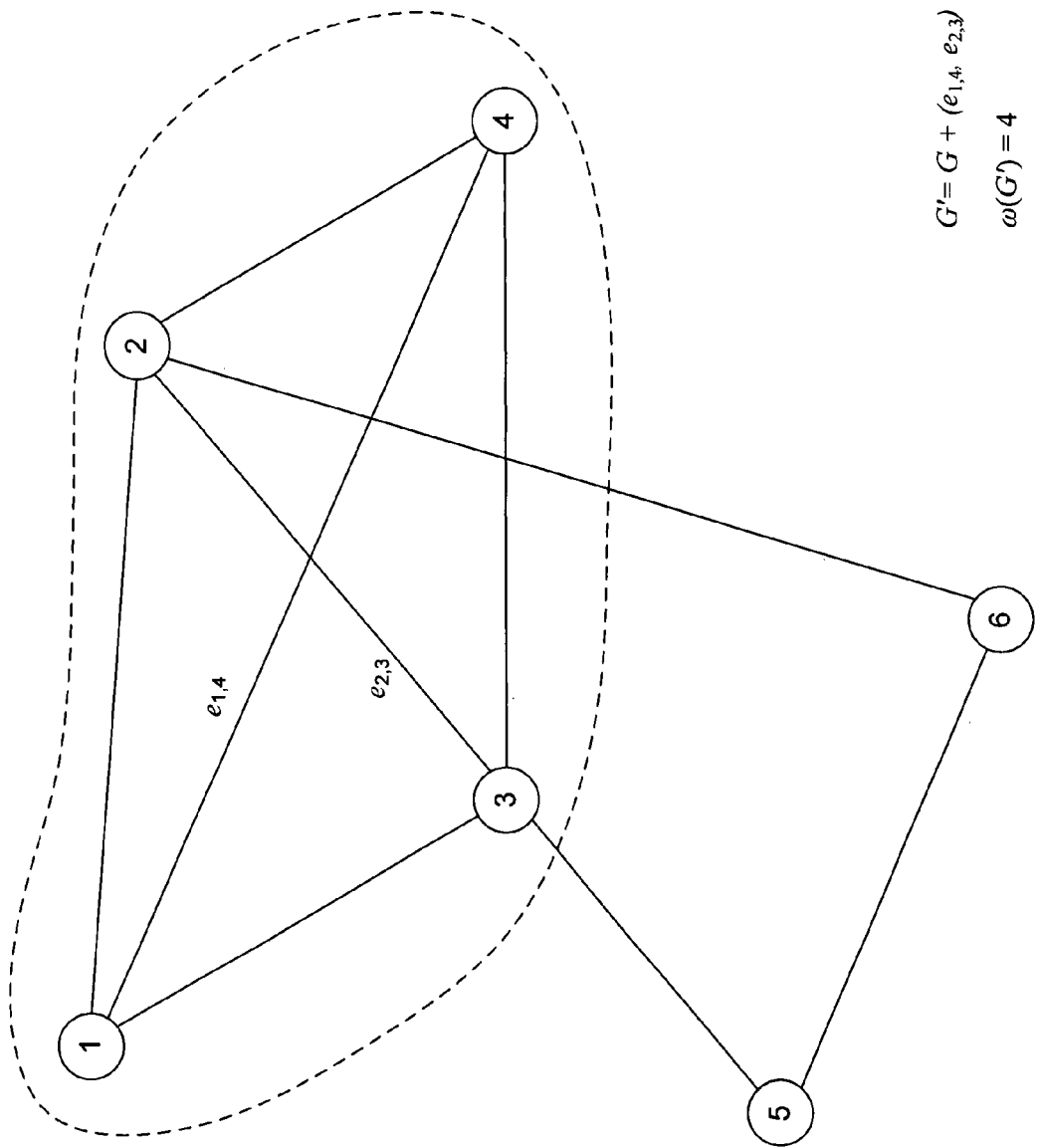
FIG. 5 shows a graph G' derived from the graph G shown in FIGS. 1-4 by addition of two new edges.

FIG. 5 shows a graph G' derived from the graph G shown in FIGS. 1-4 by addition of two new edges. Two edges $e_{1,4}$ and $e_{2,3}$ have been added to graph G to create graph G' in order to illustrate the concept of a clique. A clique is a subset of vertices within a graph that are fully interconnected by edges. In graph G' shown in FIG. 5, vertices 1, 2, 3, and 4 are fully connected, since there is an edge interconnecting each possible pair of vertices selected from the subset of vertices $\{1,2,3,4\}$. The clique number of a graph, denoted $\omega(G)$, is the cardinality of the largest clique in the graph. The cardinality of graph G' shown in FIG. 5, $\omega(G')$, is 4, since the above-described clique is the largest clique within graph G'.

Figure 6:
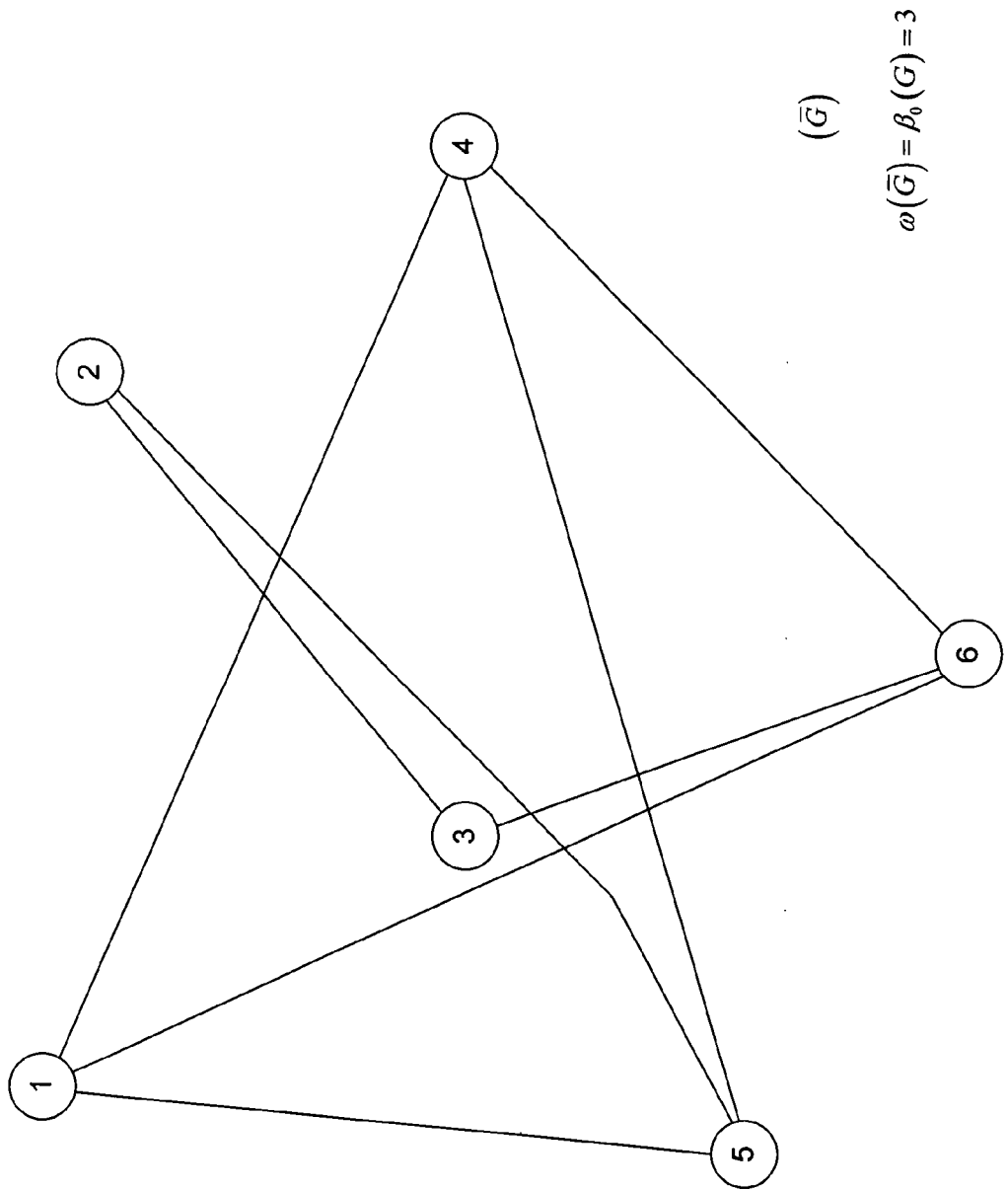
FIG. 6 shows the complementary graph of graph G.

FIG. 6 shows the complementary graph of graph G. The complementary graph of graph G is denoted $\overline{G}$. The complementary graph $\overline{G}$ has edges connecting vertices unconnected in G and lacks the edges present in graph G. The clique number of the complementary graph of graph G, $\omega(\overline{G})$, is equal to the cardinality of the maximum independent subset of graph G, $\beta_0(G)$. The cardinality of the largest independent subset of vertices in graph G s is three, and thus the clique number of the complement of graph G, $\overline{G}$, is also three. One clique with cardinality 3 consists of the set of vertices $\{1,4,6\}$.

Figure 7:
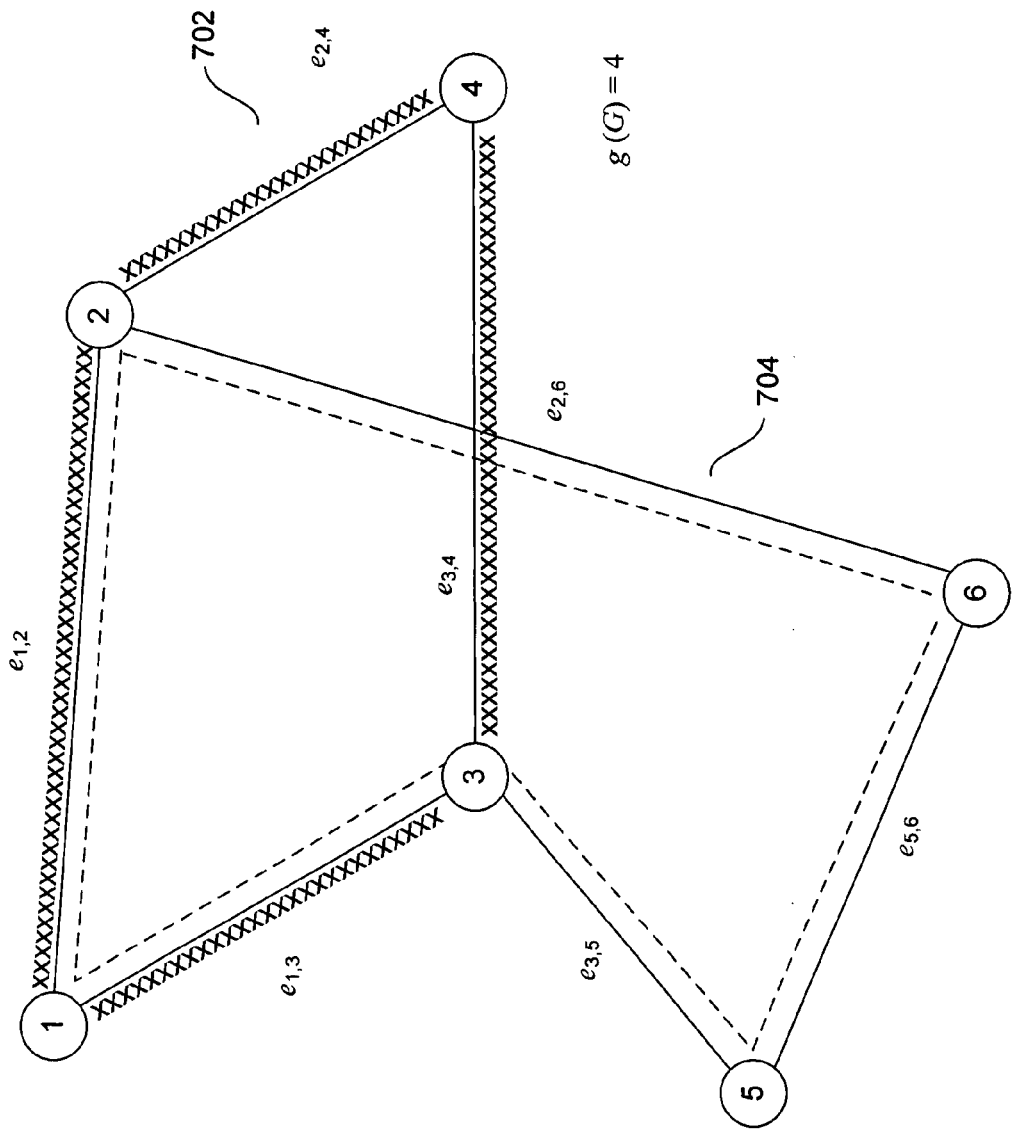
FIG. 7 illustrates two different cycles within the graph G shown in FIGS. 1-4.

Each edge of a pair of adjacent edges shares a common vertex. A cycle within a graph is a sequence of adjacent edges that begins and ends at one, particular vertex. FIG. 7 illustrates two different cycles within the graph G shown in FIGS. 1-4. The first cycle 702, denoted by a series of small "x" symbols along the edges of the cycle, comprises the set of edges $\{e_{1,2}, e_{2,4}, e_{3,4}, \text{ and } e_{1,3}\}$. A second cycle 704, denoted by a series of small "-" symbols along the edges of the cycle, comprises the set of edges $\{e_{1,2}, e_{2,6}, e_{5,6}, e_{3,5}, \text{ and } e_{1,3}\}$. A cycle of three edges is referred to as a "triangle." The girth of a graph, denoted as g(G) for graph G, is the length, in edges, of the shortest cycle within the graph. The girth of graph G shown in FIGS. 1-4 and 7 is four, since graph G has two cycles of length 5 and one cycle of length 4.

Figure 8:
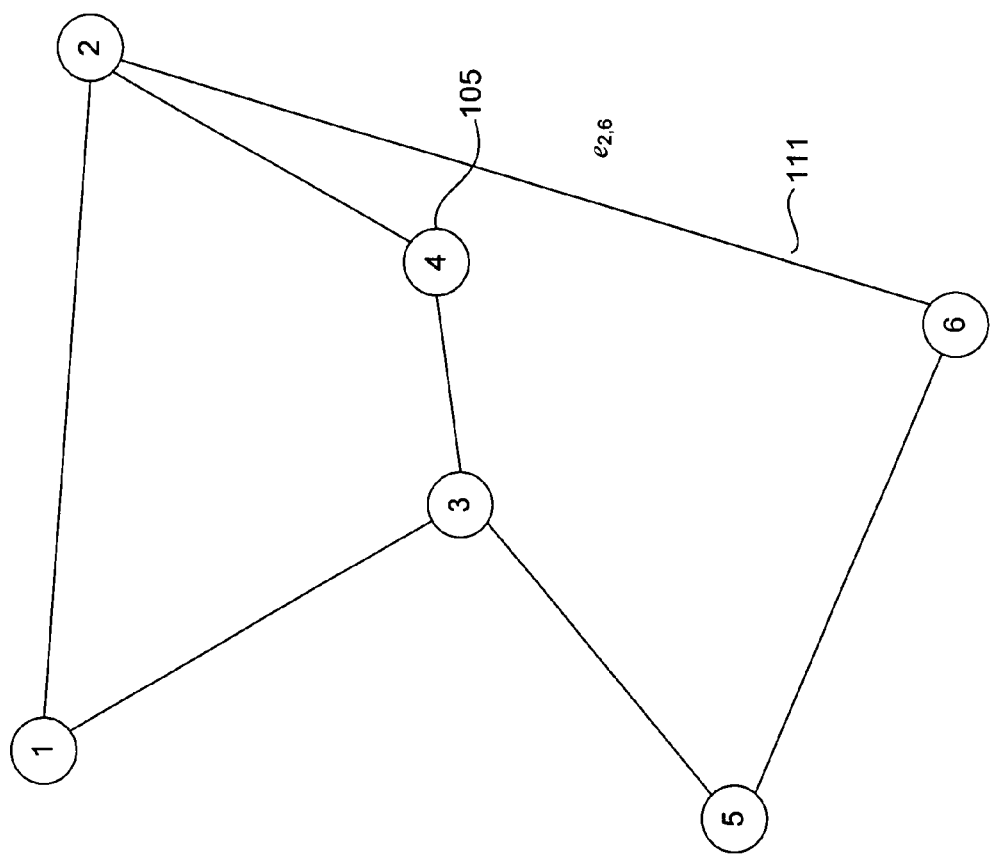
FIG. 8 shows an alternative illustration of the graph G shown in FIGS. 1-4 and 7.

A complete graph on p vertices is denoted by $K_p$, and the complete bipartite graph on independent sets of p and q vertices is denoted by $K_{p,q}$. FIG. 8 shows an alternative illustration of the graph G shown in FIGS. 1-4 and 7. In FIG. 8, vertex 4 105 has been moved leftward to the left-hand side of edge $e_{2,6}$ 111. In the alternative representation shown in FIG. 8, no pair of edges crosses over one another. A graph that can be drawn so that no pair of edges crosses over one another, such as graph G, is referred to as a planar graph. A graph can be colored by assigning one of a number of colors, or values, to each node within the graph. A graph is perfectly colored by n colors when, after assigning colors to each vertex in the graph, no single edge connects two vertices having the same color. A graph that is perfectly colored by n vertices is n-partite. The term "edge contraction" refers to combining two adjacent nodes into a single node, and removing the edge that originally connected the two combined nodes.

A few of the many graph theorems are next provided as a foundation for subsequent descriptions of method and system embodiments of the present invention:

Theorem 1. If $\Delta(G) \geq 2$, then $\chi(G) = \Delta G$ unless
  (1) $\Delta(G) = 2$ and G contains a cycle of odd length; or
  (2) $\Delta(G) > 2$ and G contains a clique of size $\Delta(G) + 1$.

Theorem 2. A graph is bipartite if and only if it has no cycles of odd length.

Theorem 3. For any positive integers h and k, there exists a graph with $g(G) \geq h$ and $\chi(G) \geq k$.

Theorem 4. A finite graph G is planar if and only if it has no subgraph that is edge-contractable to $K_5$ or $K_{3,3}$.

Theorem 5. Every planar graph can be perfectly colored with 4 colors. Equivalently, $\chi(G) \leq 4$ for every planar graph.

Theorem 6. $\chi(G) = 3$ for every planar graph without four triangles.

Theorem 7. Consider the function $f$ from graphs to integers such that $f(G)$ is the maximum number of edges among all the bipartite subgraphs of G. Then $$f(G) > \frac{|E|}{2}.$$

Theorem 8. Consider the function h from integers to integers such that h(e) is the largest integer having the property that every graph with e edges has a bipartite subgraph with at least h(e) edges. Then $$h(e) \geq \frac{e}{2} + \frac{-1 + \sqrt{8e+1}}{8}$$

Theorem 9. A triangle-free graph of n vertices and e edges can be made bipartite by removing at most $$\text{Min}\left\{ \frac{e}{2} - \frac{(2e(2e^2 - n^3)}{n^2(n^2 - 2e)} \right), e - \frac{4e^2}{n^2} \right\}$$

edges.

Theorem 10. Every graph has a bipartite subgraph on half of its vertices.

Theorem 11. Consider the function $f$ from graphs to integers such that $f(G)$ is the maximum number of edges among all of the bipartite subgraphs of G. If G is a triangle-free graph with e edges on n vertices with degrees $\{d_i\}_{i=1\ldots n}$ then $$f(G) > \frac{e}{2} + \frac{1}{8\sqrt{2}} \sum_{i=1}^{n} \sqrt{d_i}$$

RFID Tags and RFID-Tag Readers

Figure 9:
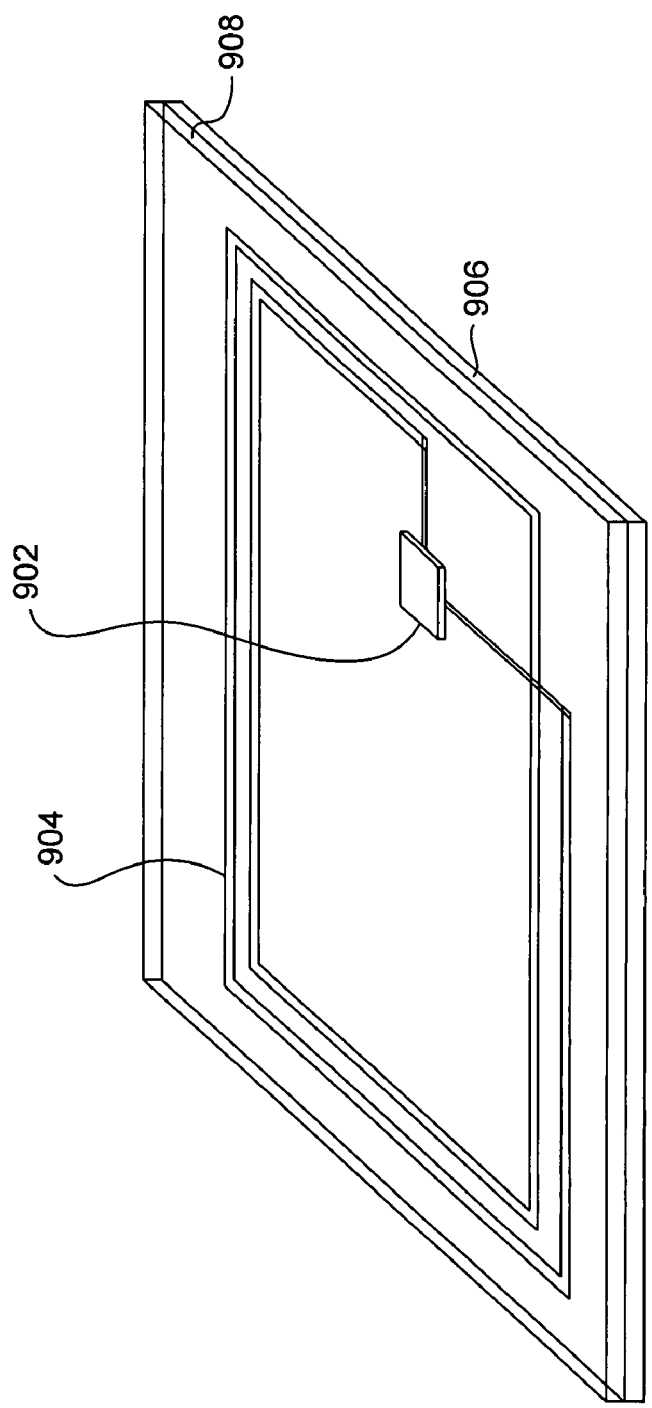
FIG. 9 illustrates the basic components of a passive RFID tag.

There are many different types of RFID tags and RFID readers. FIG. 9 illustrates the basic components of a passive RFID tag. A passive RFID tag may include an integrated circuit ("IC") 902, or chip, and an antenna 904, both affixed to a substrate 906 and covered by a film or coating 908. The IC includes logic circuitry, power-harvesting circuitry, and memory, and the antenna 904 receives an RF carrier signal from an RFID-tag reader that is used by the passive RFID tag for power, for an internal clock signal, and as a communications medium for returning data stored in the RFID tag to the RFID-tag reader. Passive RFID tags do not contain batteries, capacitors, or other stored energy sources, but instead harvest all the power needed to power the IC from the RF carrier signal. Semi-passive RFID tags include batteries to power the IC, but use the RF carrier signal from an RFID-tag reader for transmission of data. Active RFID tags include batteries and transmitters for transmitting data back to RFID-tag readers.

Figure 10:
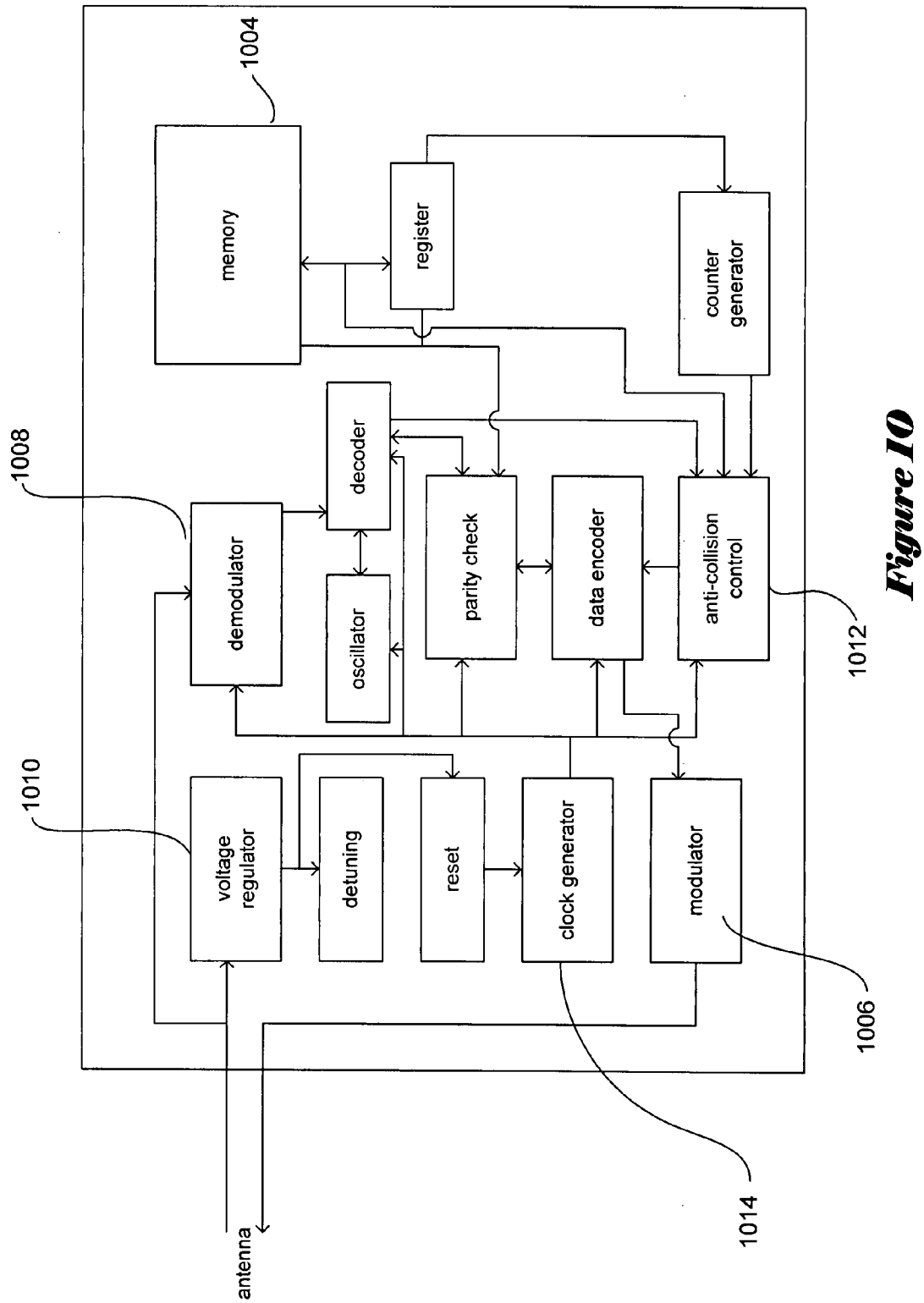
FIG. 10 illustrates the circuit modules fabricated within the IC of an exemplary passive-RFID-tag IC.

FIG. 10 illustrates the circuit modules fabricated within the IC of an exemplary passive-RFID-tag IC. The RFID-tag IC includes a very small memory 1004, such as an electronically erasable and programmable read-only memory ("EEPROM") capable of storing 96 bits, 1024 bits, or a greater number of bits of information. In general, the memory stores a digitally-encoded identifier, such as a product code and serial number, or other such information appropriate for the application in which the RFID tag is used. The RFID tag receives and transmits information by detecting modulation of, and generating modulation of, the received RF carrier signal. Thus, the IC includes both a modulator 1006 and demodulator, for transmitting and receiving information, respectively, on the RF carrier signal. As mentioned above, the RFID-tag IC is powered by energy extracted from the RF carrier signal, and therefore includes power extraction, regulation, and rectifying components, such as voltage regulator 1010. The RFID tag also includes circuitry that implements an anti-collision strategy 1012 that is discussed in greater detail below. In addition to receiving data and power from the RF carrier signal, the RFID tag also divides the RF carrier-signal frequency in order to generate a clock signal, by a clock-generator component 1014, that is used to control and synchronize the IC components. RFID-tag readers include complementary features and components for generating the RF carrier signal and for detecting modulation of the RF carrier signal in order to receive information from RFID tags within range of the RFID-tag reader.

Figure 11:
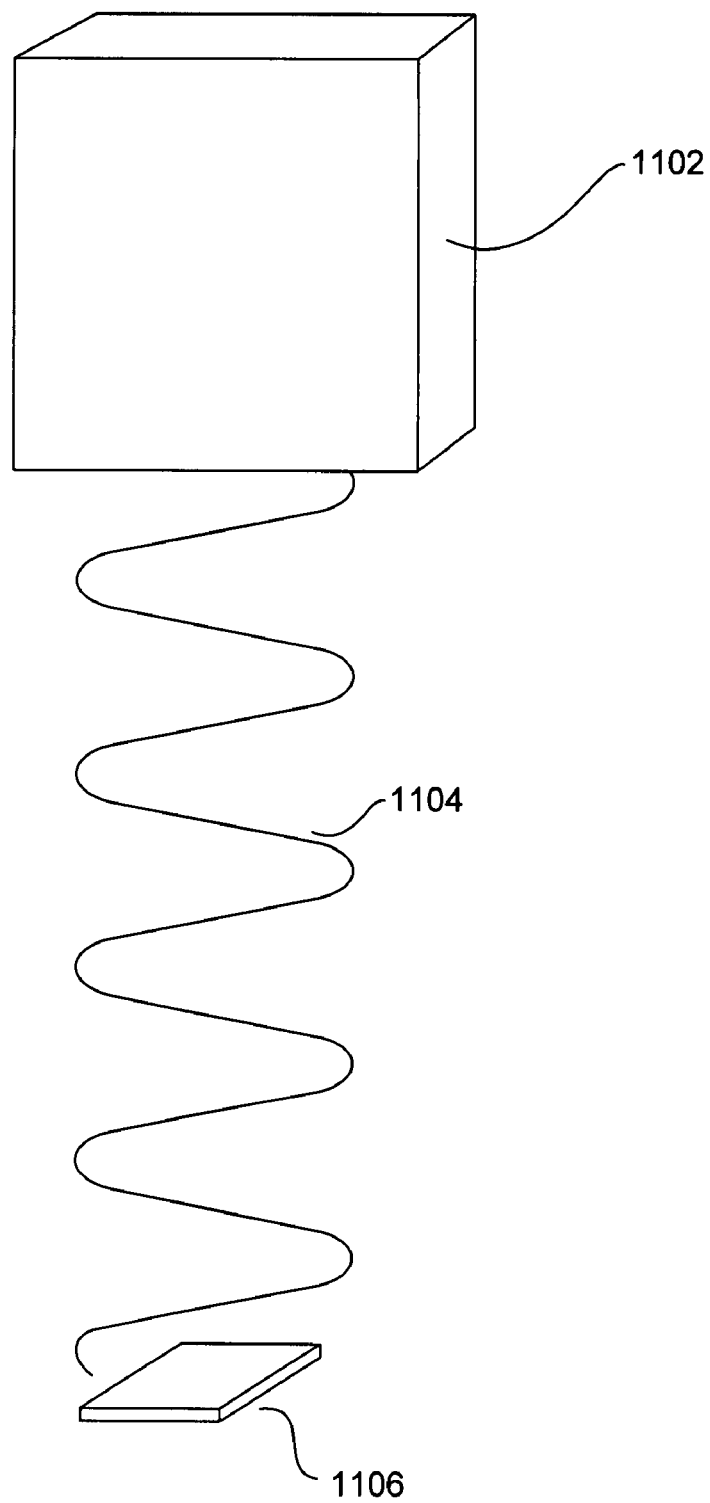
FIGS. 11-13C illustrate the basic operation of an RFID tag and RFID-tag reader.
Figure 12:
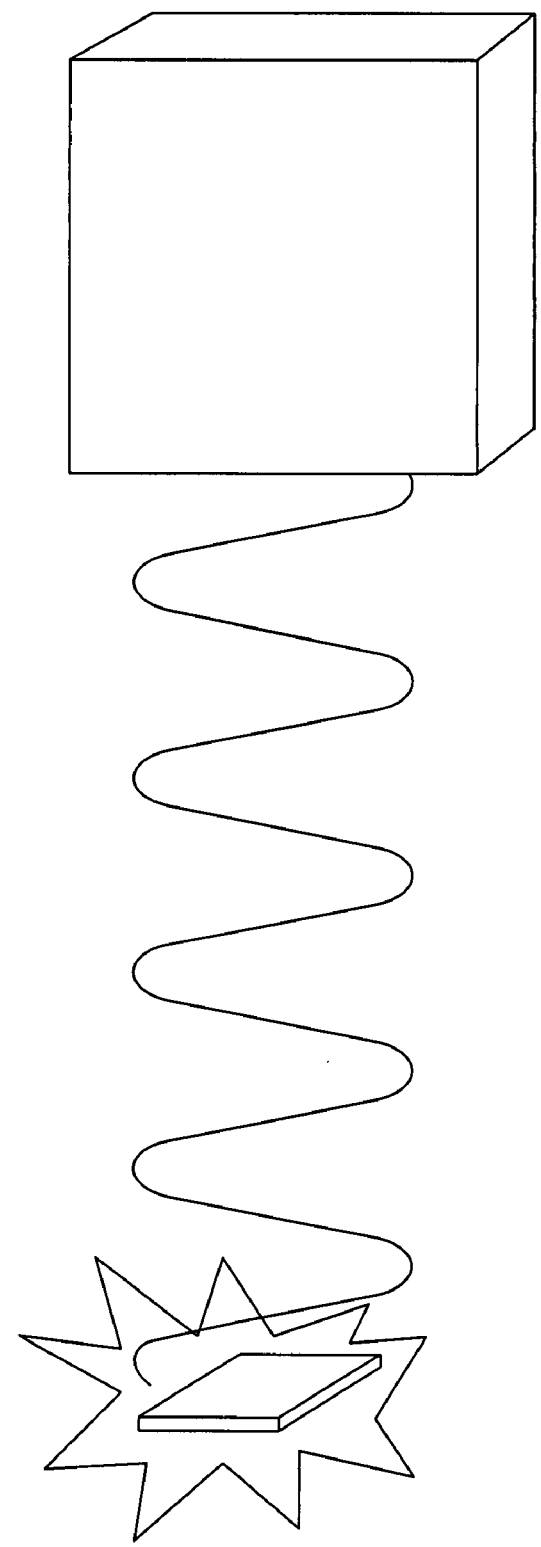

FIGS. 11-13C illustrate the basic operation of an RFID tag and RFID-tag reader. First, as shown in FIG. 11, an RFID-tag reader 1102 transmits an RF carrier signal 1104 to a surrounding region that includes an RFID tag 1106. When the RFID tag is close enough to the RFID-tag reader, or, in other words, within the field of the RFID-tag reader, and when the RFID tag is oriented so that the antenna of the RFID tag can extract sufficient energy from the RF carrier signal, as shown in FIG. 12, then the RFID tag generates sufficient current to operate the RFID-tag IC. Once energized, the RFID tag extracts information from the RFID-tag memory and transmits the information back to the RFID-tag reader by modulating the RF carrier signal generated by the RFID-tag reader.

Figure 13A:
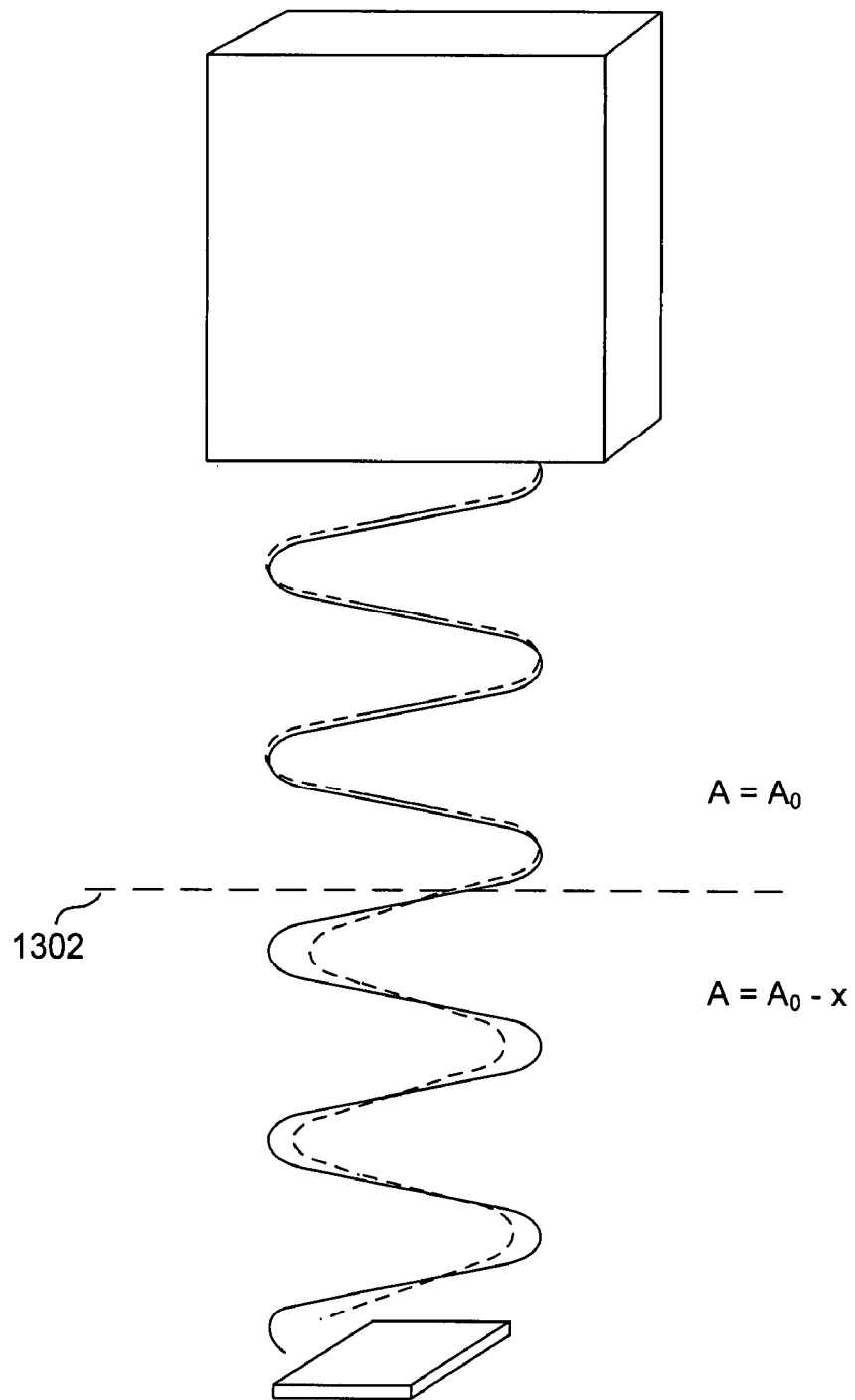
Figure 13B:
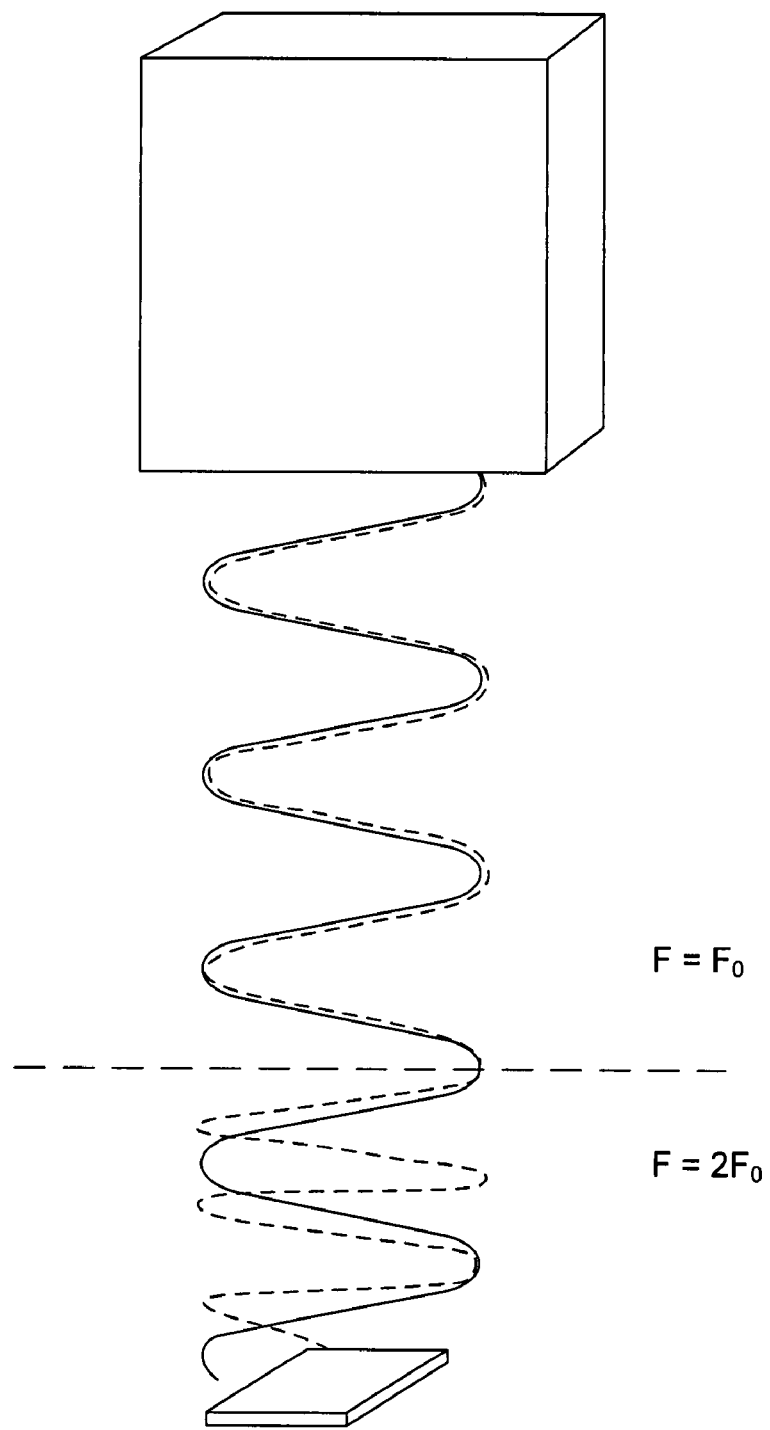
Figure 13C:
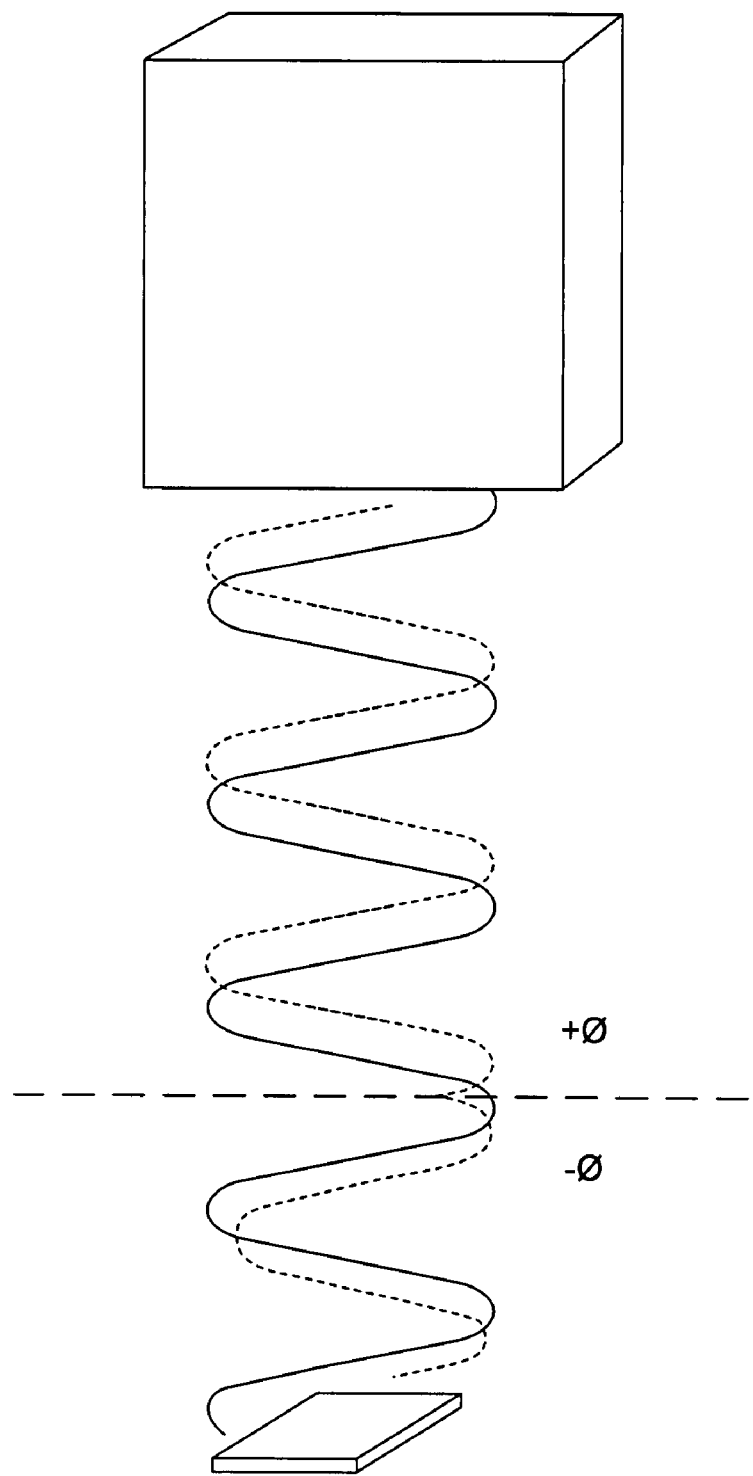

FIG. 13A-C illustrate three of various types of carrier-signal modulation employed by RFID tags. In a first modulation technique, illustrated in FIG. 13A, the RFID tag modulates the amplitude of the RF carrier signal, at discrete intervals of time, to generate a binary-encoded RF-carrier-signal modulation that can be detected and read by the RFID-tag reader. For example, unmodulated RF-carrier signal, above the dashed line 1302 in FIG. 13A, may correspond to a binary "0" value, while modulated RF-carrier signal, below the dashed line 1302 in FIG. 13A, may correspond to a binary "1" value. The RFID tag can modulate the amplitude of the RF carrier signal by shunting the antenna to remove energy from the RF carrier signal. The RFID-tag reader detects the presence or absence of amplitude modification at discrete intervals of time, and translates the modulation into a digital, binary signal. As shown in FIG. 13B, the RFID tag may modulate the RF carrier signal by changing the frequency of the RF carrier signal, and as shown in FIG. 13C, the RFID tag may alternatively modulate the RF carrier signal by changing the phase of the RF carrier signal. A variety of different types of data encodings can be employed by RFID tags and RFID tag readers, including direct encodings, differential biphase encodings, Manchester encodings, and other encodings. When the RFID-tag reader successfully receives the digitally encoded data transmitted by the RFID tag, the RFID tag has been successfully read.

As mentioned above, RFID tags are employed to associate physical objects with digitally encoded information in a variety of different settings and applications. It is a common practice to inject tiny RFID tags into laboratory animals and pets to allow the laboratory animals and pets to be subsequently identified by reading digitally encoded animal identifications from the RFID tags. Many different types of products currently bear RFID tags to allow the products to be detected and monitored during shipment and to facilitate inventory control within distribution centers and retail establishments.

Figure 14:
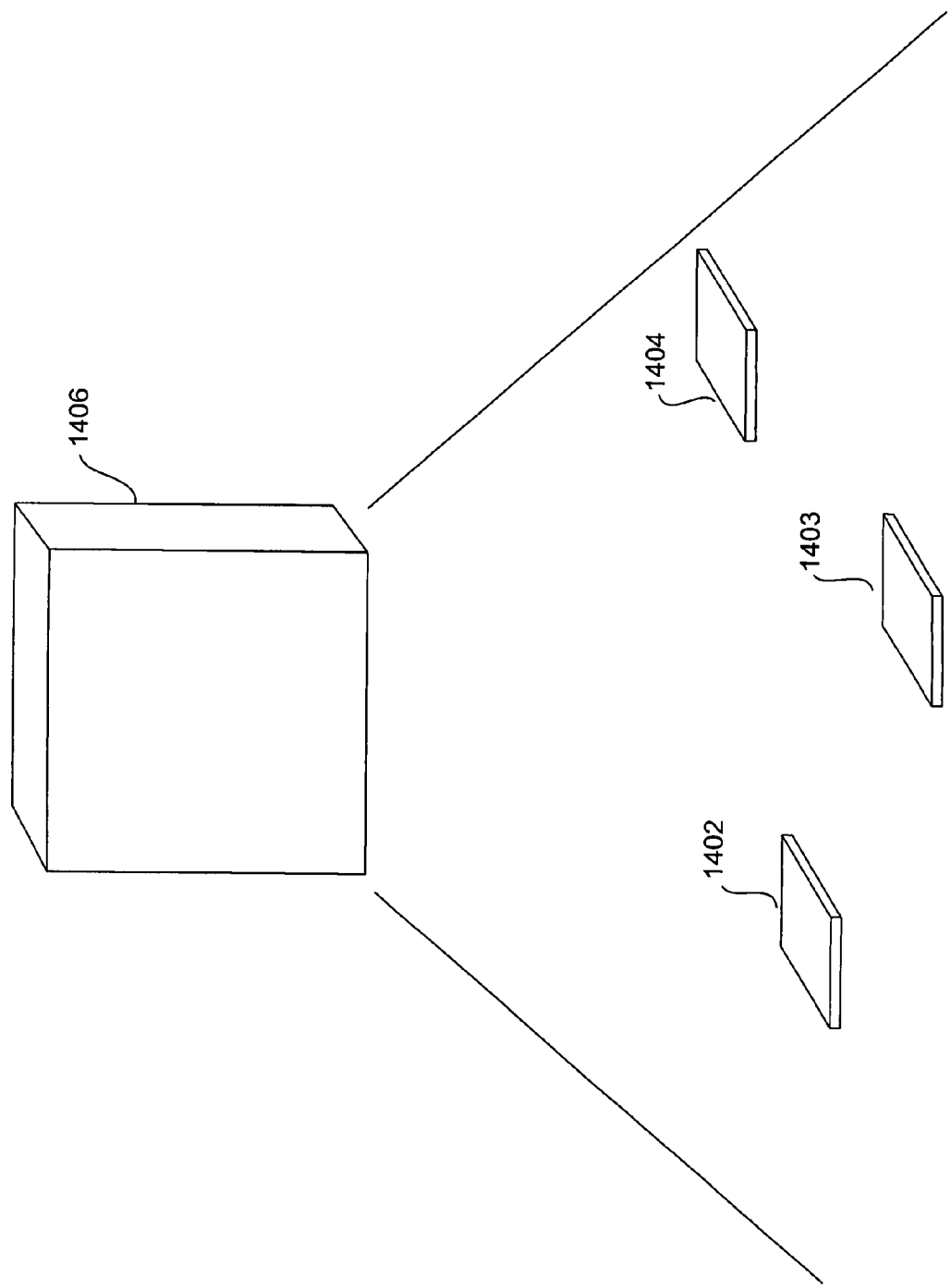
FIG. 14 illustrates a slightly more complex interaction in which a single RFID-tag reader interrogates multiple RFID tags within its range.

The simple interrogation sequence shown in FIGS. 11-13C, in which a single RFID-tag reader detects a single RFID tag within its environment, or range, represents probably the simplest RFID tag/RFID-tag reader interaction. FIG. 14 illustrates a slightly more complex interaction in which a single RFID-tag reader interrogates multiple RFID tags within its range. As shown in FIG. 14, three different RFID tags 1402-1404 are within the range, and properly oriented with respect to, a single RFID-tag reader 1406. When the RFID-tag reader sends out an RF carrier signal, as illustrated in FIG. 15, all three of the RFID tags within the range of, and properly oriented with respect to, the RFID-tag reader may attempt to respond to the detected RF carrier signal by modulating the RF carrier signal to transmit their stored information back to the RFID reader, as shown in FIG. 16. Unfortunately, when more than one RFID tag attempts to transmit information at a given point in time, the unsynchronized RFID-tag modulations of the RF carrier wave result in a garbled and undecipherable modulation-based signal that cannot be read by the RFID-tag reader.

A number of different techniques are used to allow for successful interrogation, by an RFID-tag reader, of multiple RFID tags within its range. First, as shown in FIG. 17, the RFID-tag reader may emit multiple different RF carrier signals with different frequencies. RFID tags can be designed to each receive energy from, and respond to, one of a number of different RF carrier frequencies. Providing that there are sufficient available RF carrier-signal frequencies so that each of the multiple RFID tags within an RFID-tag reader's field responds to a different RF carrier-signal frequency, then frequency-based multiplexing, as shown in FIG. 17, represents an effective approach to interrogation of multiple RFID tags within the range, or field, of an RFID-tag reader.

Figure 18B:
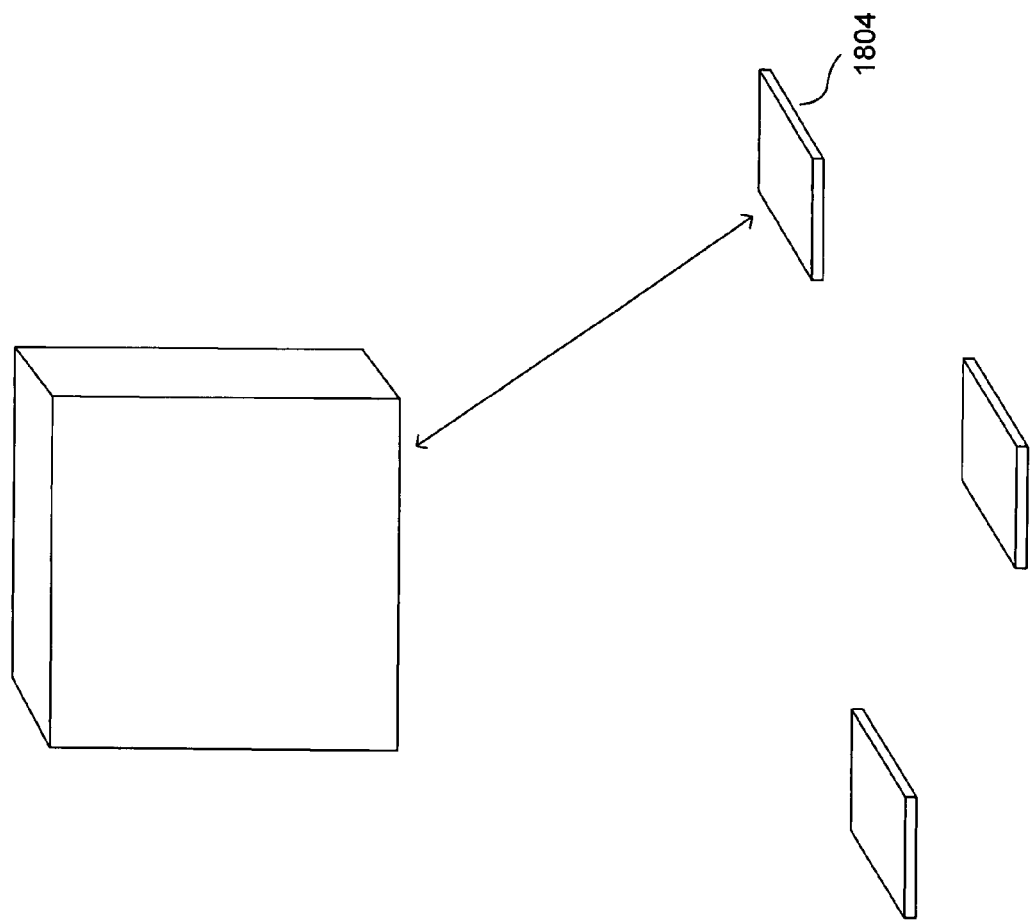

Another approach to interrogating multiple RFID tags within an RFID-tag reader's field is to use time-based multiplexing by RFID tags and RFID-tag readers. FIGS. 18A-C illustrate one time-based multiplexing technique that employs a collision-avoidance technique. Returning briefly to FIG. 16, in the case that multiple RFID tags that all respond to a single RF frequency attempt to respond simultaneously or concurrently to a detected RF carrier signal broadcast by an RFID-tag reader, the RFID tags, as well as the RFID-tag reader, can detect multiple, overlapping attempts to modulate the RF carrier signal, and the RFID tags can immediately cease transmitting information back to the RFID-tag reader. Each RFID tag then waits for a period of time determined by information stored within the RFID tag, and then again attempts to transmit information back to the RFID-tag reader. Different RFID tags wait for different periods of time before attempting retransmission as a result of the different back-off times stored in each of the RFID tags. Thus, in FIG. 18A, a first RFID tag 1802 with the shortest stored back-off time waits for that back-off time and then transmits the identification information stored within the RFID tag back to the RFID reader. Next, as shown in FIG. 18B, a second RFID tag 1804 with the second-longest stored back-off time completes waiting, and then transmits the information stored within the second RFID tag's memory back to the RFID tag reader. Finally, as shown in FIG. 18C, the RFID tag 1806 with the longest stored back-off time completes waiting, and then transmits the information stored within the third RFID tag's memory back to the RFID tag reader. Similar back-off algorithms are employed for collision avoidance in Ethernet local area networks and in various communication protocols.

Figure 19:
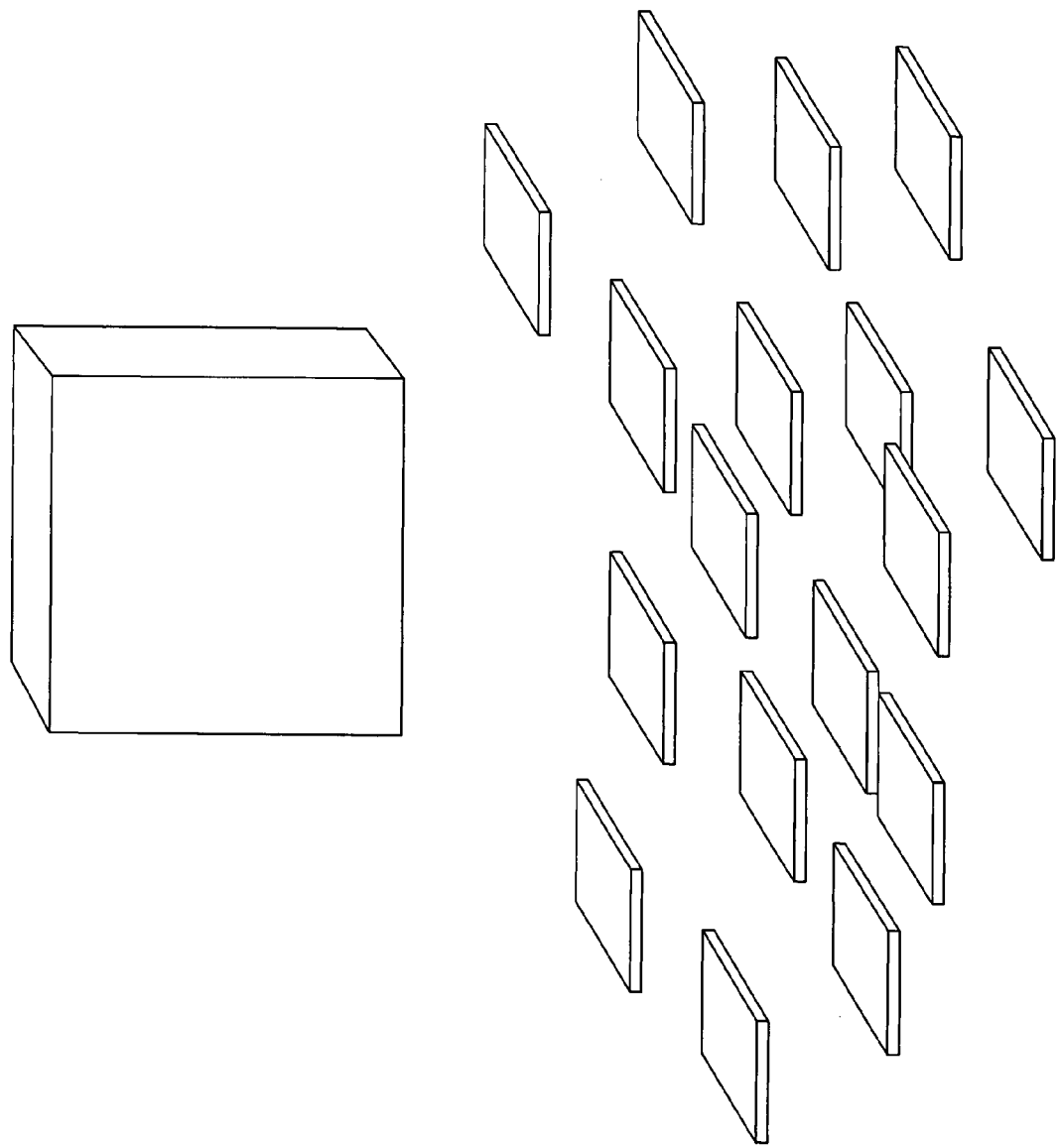
FIG. 19 shows a number of different RFID tags within the field of, and properly oriented with respect to, a single RFID-tag reader.

Although frequency multiplexing and time-based multiplexing can be used to attempt to avoid simultaneous transmission by two or more RFID tags, or collisions, when multiple RFID tags are within the field of an RFID tag reader, a sufficient number of RFID tags within the field of an RFID-tag reader may overwhelm either approach and lead to collisions and failures to receive information by the RFID-tag reader from one or more RFID tags within the field. FIG. 19 shows a large number, 17, of different RFID tags within the field of, and properly oriented with respect to, a single RFID-tag reader. In the case shown in FIG. 19, if there are less than 17 available frequencies for frequency-based multiplexing, or less than 17 different back-off times available for time-based multiplexing, one or more collisions between transmitting RFID tags may occur. The problem may be exacerbated, in the case of time-based multiplexing, when the RFID tags are moving relative to the RFID-tag reader, so that the multiple RFID tags are present within the field of the RFID-tag reader for only a limited duration of time.

Figure 20:
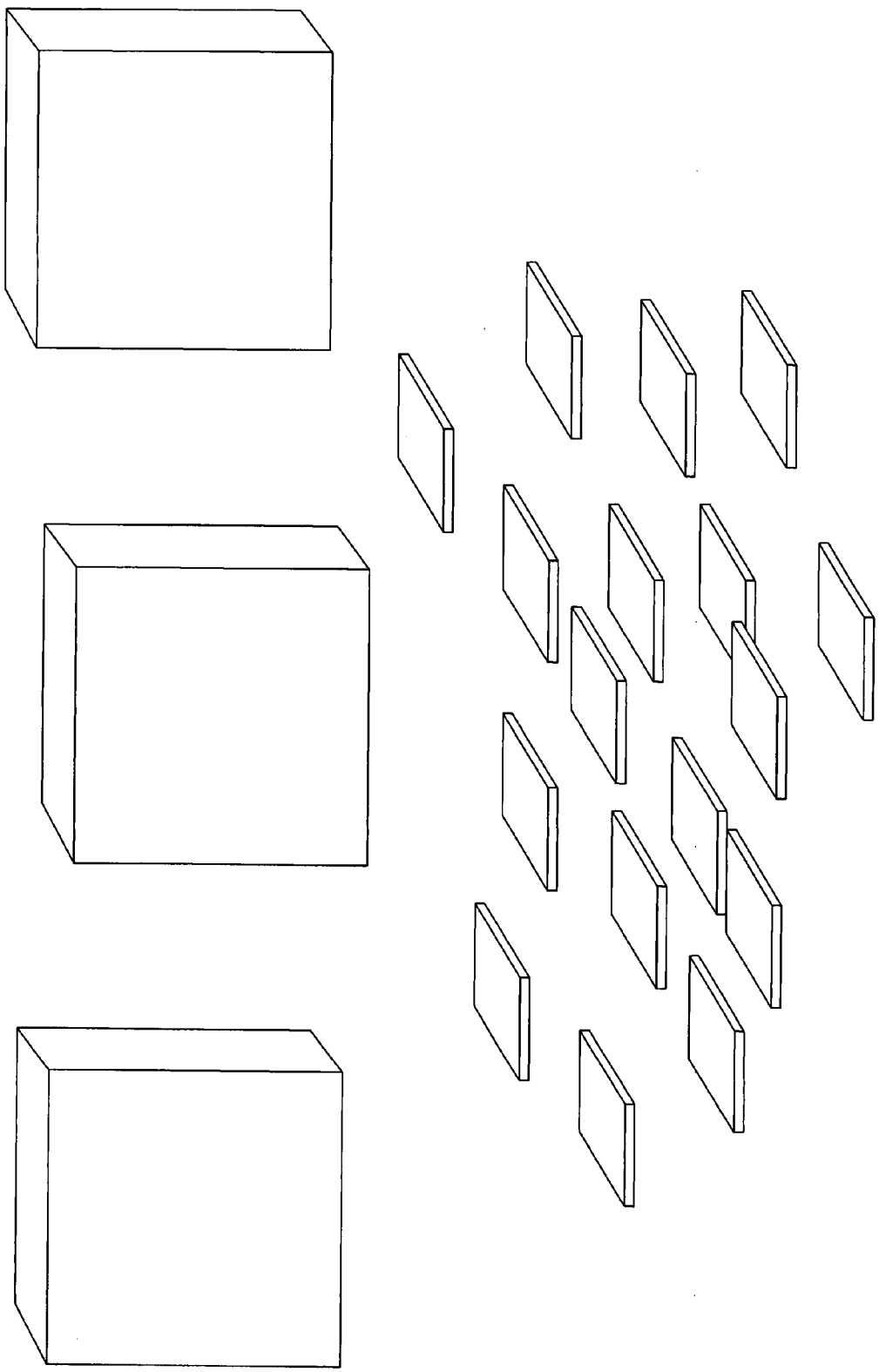
FIG. 20 shows a number of different RFID tags within the field of, and properly oriented with respect to, three different RFID-tag readers.

FIG. 20 illustrates an even more complex situation in which 17 different RFID tags are within the field of, and properly oriented with respect to, three different RFID-tag readers. Although complex protocols may be developed to extend time-based multiplexing, frequency-based multiplexing, or other types of multiplexing to multiple RFID-tag reader/multiple RFID-tag situations such as that shown in FIG. 20, such techniques and protocols are not currently employed in the vast majority of RFID tags and RFID-tag readers. One significant problem is that the cost of individual RFID tags is often a significant bottleneck for commercial RFID-tag use. Only when RFID tags can be cheaply manufactured and used can the convenience and reliability of RFID-tag labeling be economically justified. Therefore, the bulk of RFID tags are simple, passive RFID tags without complex circuitry for complex collision-avoidance strategies that would effectively deal with multiple RFID-tag reader/RFID-tag situations such as that shown in FIG. 20. For this reason, manufacturers, vendors, and users of RFID-tag-based labeling have recognized the need for strategies by which collisions can be avoided in multiple RFID-tag-reader networks in which multiple RFID-tag readers attempt to interrogate expensive, single-frequency RFID tags.

Embodiments of the Present Invention

Figure 21:
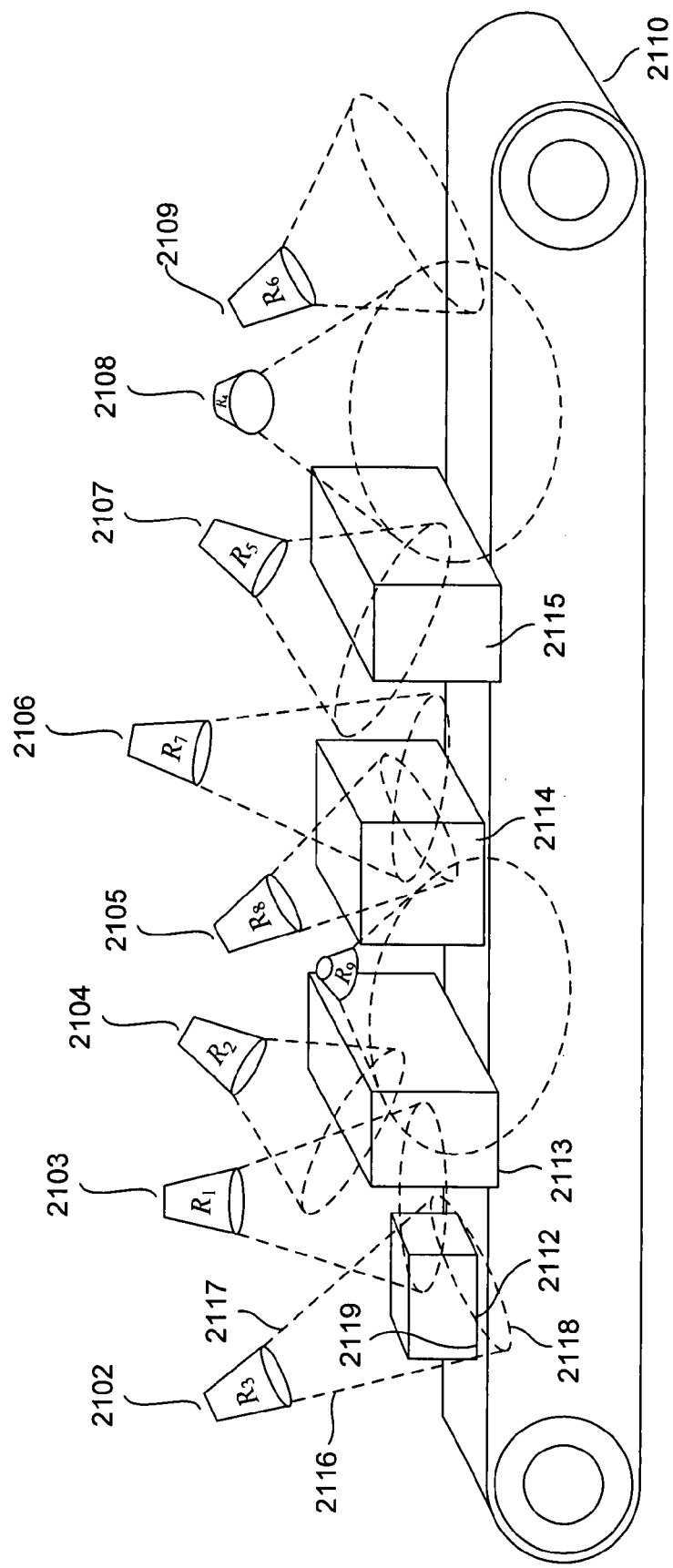
FIG. 21 illustrates a multiple RFID-tag-reader network that is used for describing method and system embodiments of the present invention.

FIG. 21 illustrates a multiple RFID-tag-reader network that is used for describing method and system embodiments of the present invention. In FIG. 21, and in subsequent figures that show the multiple-RFID-tag-reader environment shown in FIG. 21, nine different RFID-tag readers 2102-2109 are arranged above and around a conveyor belt 2110 which transports parcels 2112-2115 past the RFID-tag readers so that RFID tags within the parcels can be interrogated. The fields of the RFID-tag readers are indicated in FIG. 21 by cone-shaped volumes delineated with dashed lines. For example, the field of RFID-tag reader $R_3$ 2102 is indicated by dashed lines 2116-2119. The RFID-tag readers have different orientations and field dimensions to maximize the probability that at least one RFID-tag reader from among the nine RFID-tag readers can successfully interrogate each RFID tag within a parcel that passes the RFID-tag readers.

Figure 22:
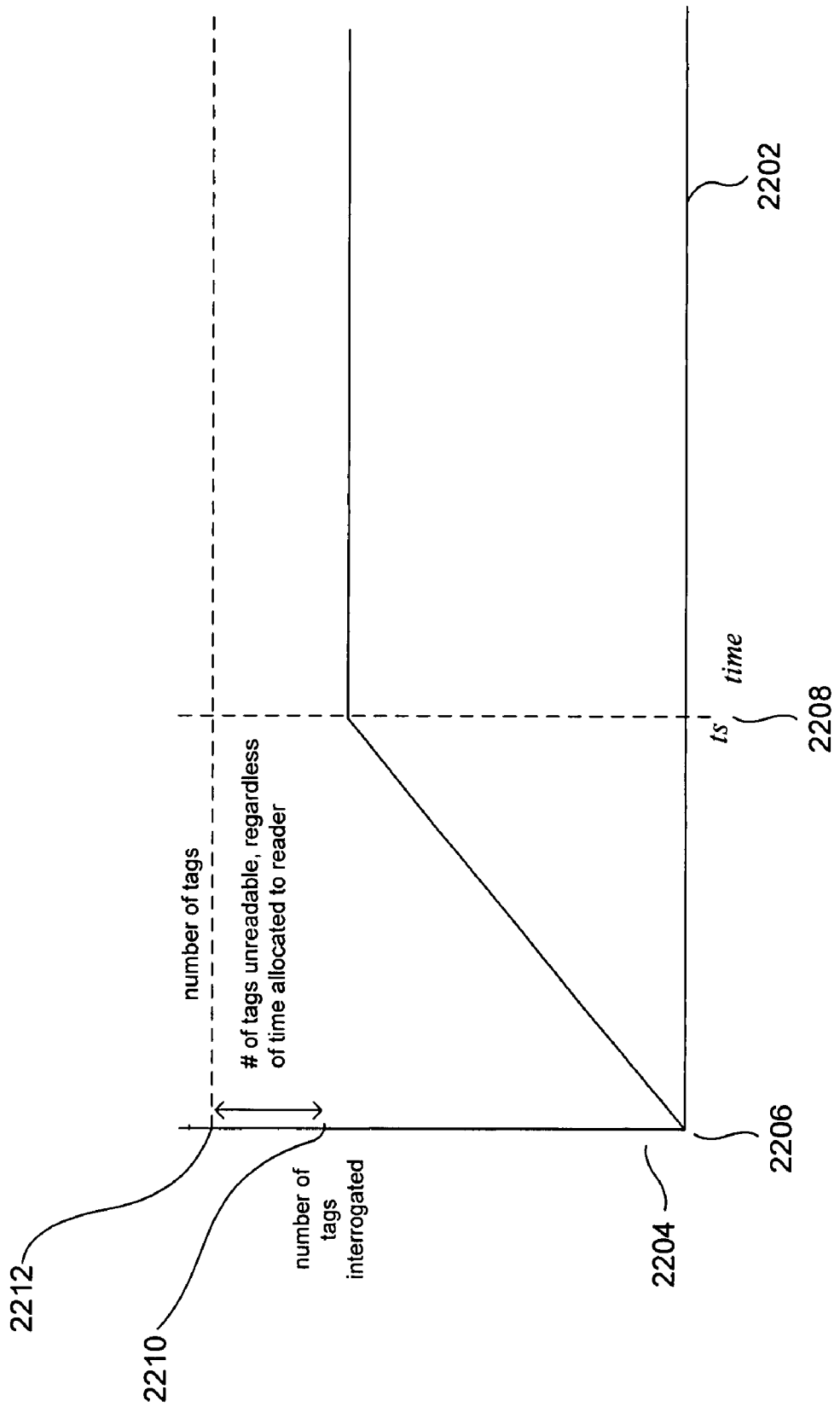
FIG. 22 illustrates a model RFID-tag-reader saturation curve.

Each RFID-tag reader can be characterized with a saturation time. When a set of RFID tags are present within the field of an RFID-tag reader, assuming that the RFID-tag reader and RFID tags employ time-based multiplexing by means of a back-off collision-avoidance method, the RFID-tag reader can steadily interrogate more and more RFID tags within its field over time up to a saturation time $t_s$, past which the RFID-tag reader cannot interrogate any additional tags. FIG. 22 illustrates a model RFID-tag-reader saturation curve. The horizontal axis 2202 represents time and the vertical axis 2204 represents the number of tags successfully interrogated by an RFID-tag reader. At time t=0 2206, no tags have been interrogated. As the time increases up to the saturation time $t_s$ 2208, the number of tags successfully interrogated linearly rises up to a saturation point 2210 representing the total number of tags that can be successfully interrogated by the RFID-tag reader. In general, the saturation point 2210 is below the total number of tags 2212 within the field of the RFID-tag reader. Often, particularly with inexpensive, passive RFID tags, a certain number of RFID tags within the field may be orientated so that the RFID-tag antennas do not sufficiently strongly couple with the RF carrier signal emitted by the RFID-tag reader to extract sufficient power to energize the RFID-tags' IC. In other cases, the tags may be defective or incompatible with the RFID-tag reader. Although a linear saturation curve is assumed, in the following discussion, a variety of different types of saturation curves may be observed for different RFID-tag readers and RFID tags. Saturation curves may be S-shaped, or described by any of a variety of different polynomial, transcendental, and other types of functions.

Figure 23:
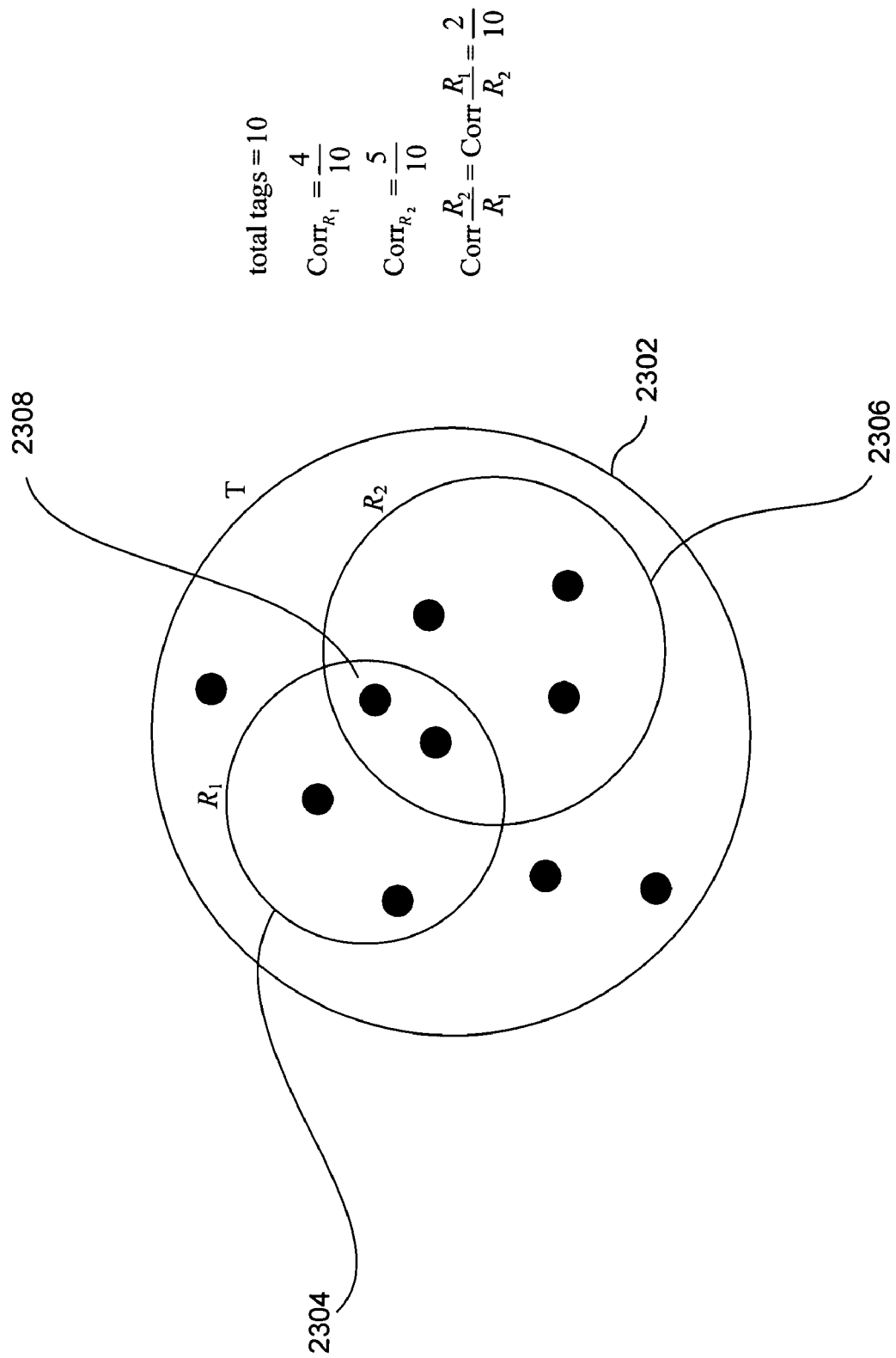
FIG. 23 illustrates two different types of correlations associated with RFID-tag readers in multi-RFID-tag-reader networks.

In a multi-RFID-tag-reader network, each RFID-tag reader can be characterized by a correlation between the RFID-tag reader and the RFID tags that move through the RFID-tag-reader's field, as well as by pairwise correlations between the RFID-tag reader and all other RFID-tag readers in the multi-RFID-tag-reader network. FIG. 23 illustrates two different types of correlations associated with RFID-tag readers in multi-RFID-tag-reader networks. In FIG. 23, the total number of RFID tags that can be potentially interrogated by two different RFID-tag readers $R_1$ and $R_2$ are contained within an outer circle 2302 labeled "T," each RFID tag represented by a small, filled circle. Of the total number of RFID tags that may be interrogated by each of the RFID-tag readers, the number of RFID tags that are successfully interrogated by RFID-tag reader $R_1$ are contained within the inner circle 2304 labeled $R_1$ in FIG. 23. Similarly the tags successfully interrogated by the RFID-tag reader $R_2$ are contained within the inner circle 2306 in FIG. 23. The number of tags successfully read by both of the RFID-tag readers $R_1$ and $R_2$ is represented in FIG. 23 by the intersection between the areas circumscribed by circles 2304 and 2306 2308. The correlation of the first RFID-tag reader $R_1$ with the tags within its field, or correlation with the event, designated $corr_{R_1}$, is the number of RFID tags successfully read by RFID-tag reader $R_1$ divided by the number of RFID tags potentially successfully interrogated by RFID-tag reader $R_1$ or, in the example shown in FIG. 23, $$\frac{4}{10}$$

or 0.4. Similarly, the correlation of RFID-tag reader $R_2$, $corr_{R_2}$, with the event is, in the example shown in FIG. 23, $$\frac{5}{10}$$

or 0.5. The pairwise correlation between the two RFID-tag readers $R_1$ and $R_2$, designated $corr_{R_1}^{R_2}$, is equal to the number of RFID tags successfully interrogated by both RFID-tag readers $R_1$ and $R_2$ divided by the total number of RFID tags potentially successfully interrogated by either or both of the RFID-tag readers, in the example shown in FIG. 23, $$\frac{2}{10}$$

or 0.2. Highly correlated RFID-tag readers may, in an environment such as that depicted in FIG. 21, represent a redundancy. RFID-tag readers with low correlations to the event, the event in the environment depicted in FIG. 21 being the total number of RFID tags within parcels that pass through the fields of the multiple RFID-tag readers during some period of time, suggest that the RFID-tag readers are ineffective, contribute little to the overall interrogation effectiveness of the multi-RFID-tag-reader network, and are potentially dispensable.

Figure 24:
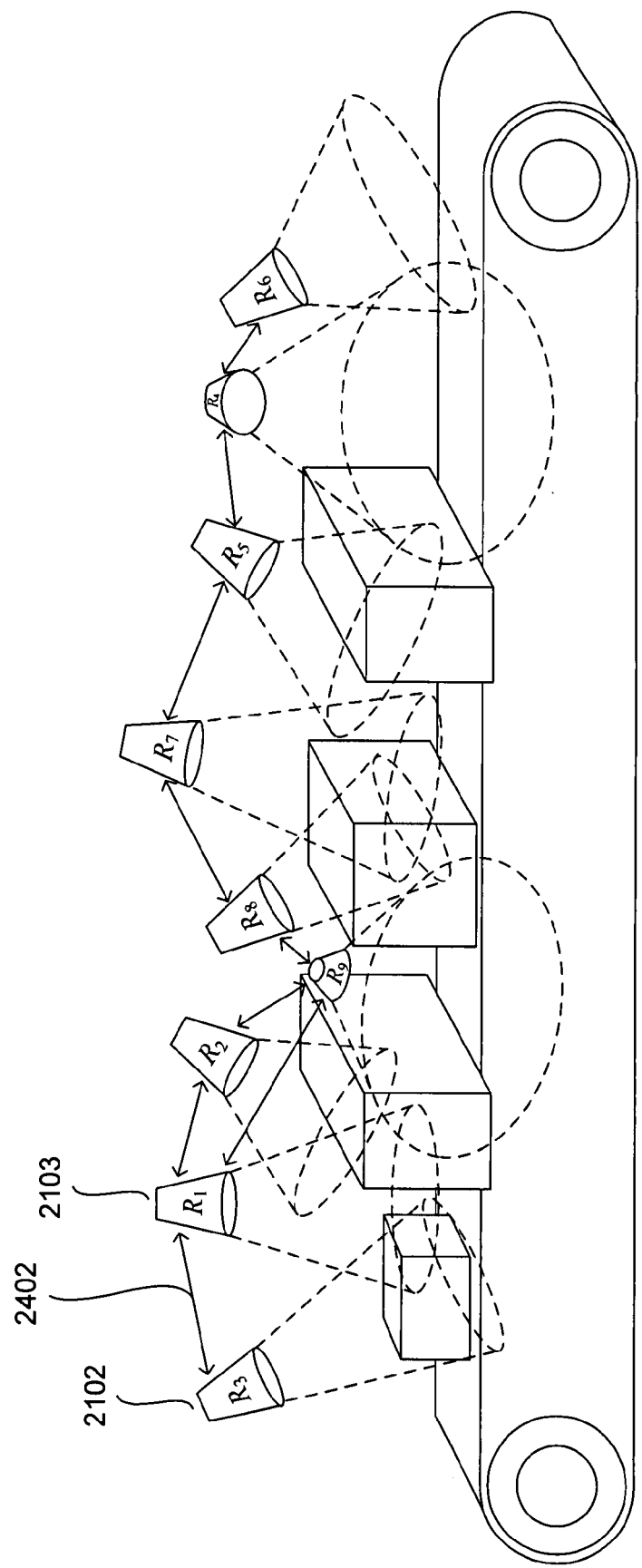
FIG. 24 illustrates pairwise interferences between RFID-tag readers in the multi-RFID-tag-reader network depicted in FIG. 21.

FIG. 24 illustrates pairwise interferences between RFID-tag readers in the multi-RFID-tag-reader network depicted in FIG. 21. In FIG. 24, RFID-tag readers with overlapping fields are indicated by double-headed arrows, such as double-headed arrow 2402 indicating that the fields of RFID-tag reader $R_3$ 2102 overlaps with the field of RFID-tag reader $R_1$ 2103. When RFID-tag-reader fields overlap, collisions may occur when RFID tags within the overlapped portion of the two fields attempt to respond to RF carrier signals emanating from the two different RFID-tag readers.

Figure 25:
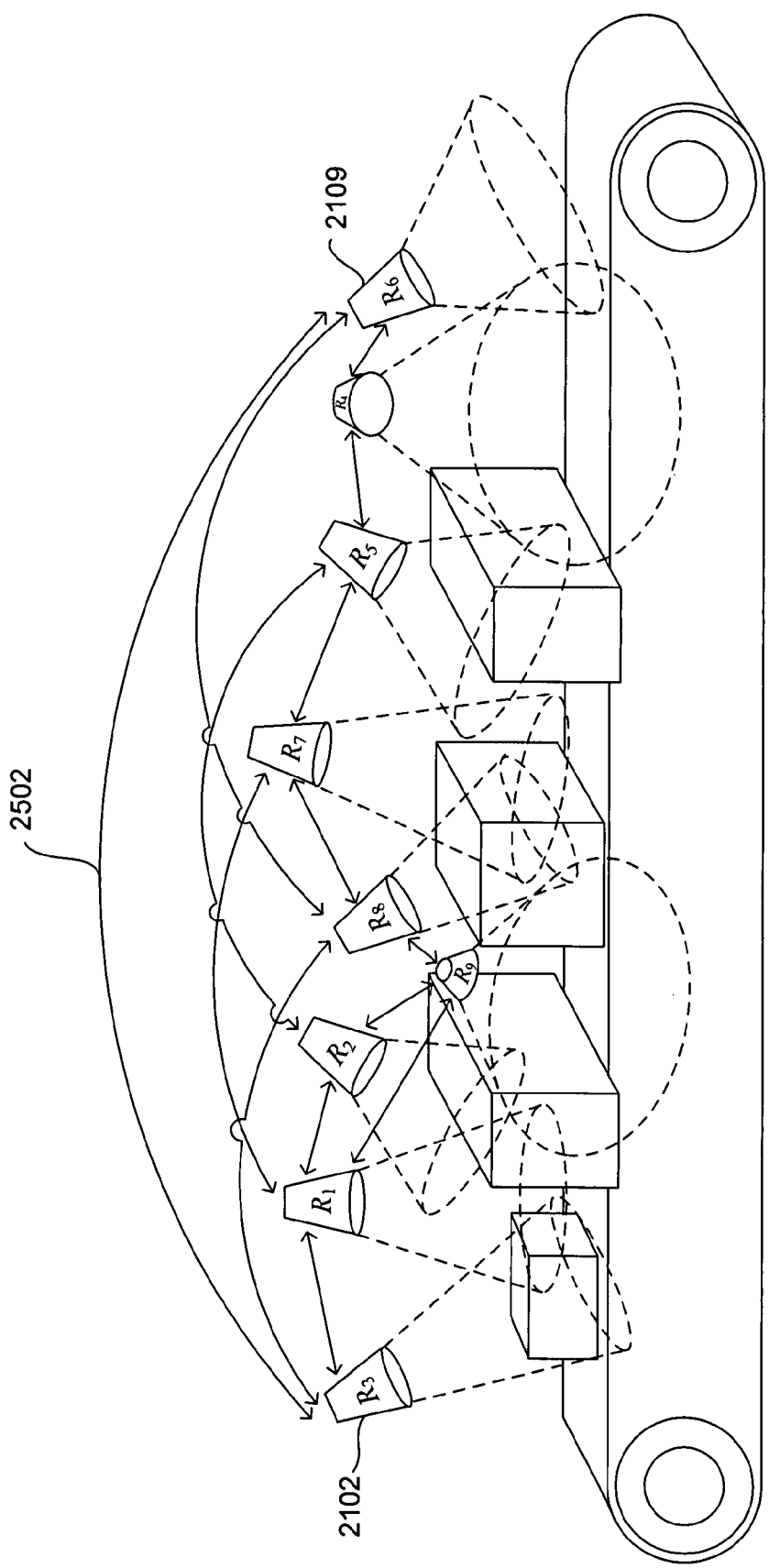
FIG. 25 illustrates high correlations between pairs of RFID-tag readers in the multi-RFID-tag-reader network shown in FIG. 21.

FIG. 25 illustrates high correlations between pairs of RFID-tag readers in the multi-RFID-tag-reader network shown in FIG. 21. In FIG. 25, double-headed arrows indicate high correlations between pairs of RFID-tag readers, such as the double-headed arrow 2502 that indicates a high correlation between RFID-tag reader $R_3$ 2102 and RFID-tag reader $R_6$ 2109. In general, high correlations exist between RFID-tag readers with similar orientations in the example of FIGS. 21 and 24-25.

Certain method and system embodiments of the present invention employ graph-theoretical modeling of a multi-RFID-tag-reader network, or network, such as that shown in FIG. 21. Two different collision-graph representations of the multi-RFID-tag-reader network shown in FIGS. 21 and 24-25 are provided in FIG. 26. In a first collision-graph representation 2602, the RFID-tag readers are represented by vertices, or nodes, such as vertex 2604 representing RFID-tag-reader $R_4$ (2108 in FIG. 21). Interferences between RFID-tag readers within the RFID-tag-reader network are represented by edges between vertices or nodes. For example, edge 2606 between vertices 2608 and 2610 representing RFID-tag readers $R_3$ 2102 and $R_1$ 2103 represents the interference illustrated in FIG. 24 by double-headed arrow 2402. In the first graph representation 2602 of the multi-RFID-tag-reader network, dashed circles, such as dashed circle 2612, are drawn around sets of RFID-tag readers that represent independent subsets of vertices. Thus, there are no edges between the vertices 2614-2617 within dashed circle 2612 indicating that there are no interferences between the RFID-tag readers represented by vertices 2614-2617. The minimal k for which collision graph 2602 is k-partite is three. An alternative collision-graph representation 2618 of the multi-RFID-tag-reader network shown in FIG. 21 is also provided in FIG. 26.

In general, in the case of frequency-based multiplexing or time-based multiplexing under conditions in which each RFID-tag reader has sufficient time to reach its saturation point for each collection of RFID tags passing within portions of its field that do not overlap with the fields of other RFID-tag readers, one can obtain optimal RFID-tag interrogation efficiency, or successful interrogation of as many RFID tags that pass through the fields of the RFID-tag readers as possible, by the multi-RFID-tag-reader network by turning on only one RFID-tag reader at a time, allowing it to reach its saturation point, turning it off, and then turning on another of the multiple RFID-tag readers so that each RFID-tag reader reaches its saturation point during a given cycle or power-on/power-off operations. Similarly, when a multi-RFID-tag-reader network can be partitioned into a number of independent sets of RFID-tag readers, so that groups of non-interfering RFID-tag readers can be powered-on, one group at a time, in a way that allows all RFID-tag readers to reach saturation, then a perfect scheduling of RFID-tag reader operation can be easily achieved, either by frequency-based or time-based multiplexing. However, when time-based multiplexing is employed by use of back-off collision avoidance methods, as discussed above, and when the RFID tags pass through an RFID-tag-reader's field too quickly to allow the RFID-tag reader to reach the saturation point, devising optimal interrogation strategies can be a complex undertaking. In such cases, it is desirable to power each of the RFID-tag readers as long as possible, in order to allow each of the RFID-tag readers to approach its saturation point as closely as possible, but alternately powering-on and powering-off RFID-tag readers with overlapping fields to avoid collisions. Such a strategy may be further adjusted by recognizing that only one of a highly correlated pair of multi-tag-readers needs to be powered-on for significant periods of time, since the highly correlated readers represent redundant interrogation, and by also recognizing that an RFID-tag reader with a low correlation to the event may be given substantially less time, or may be powered off entirely, since an RFID-tag reader with low correlation to the event may not contribute greatly to the overall degree of successful interrogation by the multi-RFID-tag-reader network. One approach to achieving efficient or optimal operation of a multi-RFID-tag-reader network is to alter the network so that the network can be modeled as a low-partite graph. In certain cases, when the network can be modeled as a bipartite graph, the greatest amount of operation time can be allocated to each RFID-tag reader within the network during each complete cycle of power-on/power-off operations, particularly in cases in which the bipartite-graph model can be achieved by rearrangement of RFID-tag readers to remove interferences or by eliminating low-event-correlation RFID-tag readers. In general, the interrogation efficiency can be considered to be the number of RFID tags successfully interrogated by at least one RFID-tag reader in a multi-RFID-tag-reader network divided by the total number of RFID tags that pass through the fields of at least on RFID-tag reader in the multi-RFID-tag-reader network.

Figure 27:
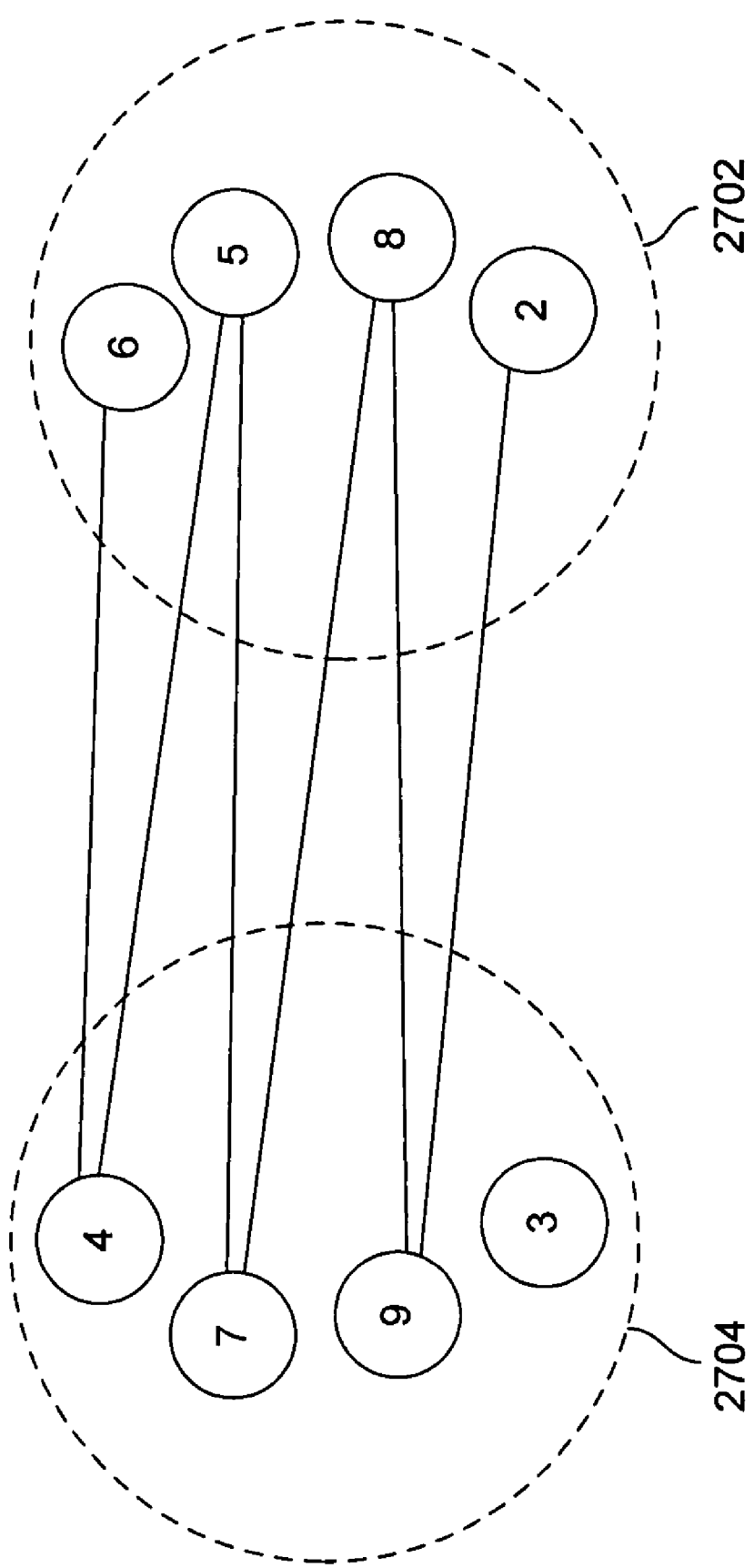
FIG. 27 illustrates a first approach to achieving efficiency in a multi-RFID-tag-reader network that represents one embodiment of the present invention.

FIG. 27 illustrates a first approach to achieving efficiency in a multi-RFID-tag-reader network that represents one embodiment of the present invention. FIG. 27 is a collision graph of the multi-RFID-tag-reader network illustrated in FIG. 21 that has been altered by removing, or permanently powering down, one of the RFID-tag readers. This can be seen by comparing the collision graph shown in FIG. 27 with collision graph 2602 in FIG. 26. The altered collision graph shown in FIG. 27 is a bipartite collision graph obtained by removing RFID-tag reader $R_1$ (2103 in FIG. 21). By removing RFID-tag reader $R_1$, the remaining RFID-tag readers can be partitioned into two independent subsets or, in other words, into two non-interfering groups. Removal of RFID-tag reader $R_1$ is an example of a node-removal perturbation of a multi-RFID-tag-reader network modeled as a collision graph. RFID-tag reader $R_9$ may also have been removed to produce a bipartite, altered collision graph, but it may be more desirable to remove RFID-tag reader $R_1$ since RFID-tag reader $R_1$ is highly correlated with RFID-tag reader $R_7$, while RFID-tag reader $R_9$ is not strongly correlated with any other RFID-tag reader in the multi-RFID-tag-reader network.

Figure 28:
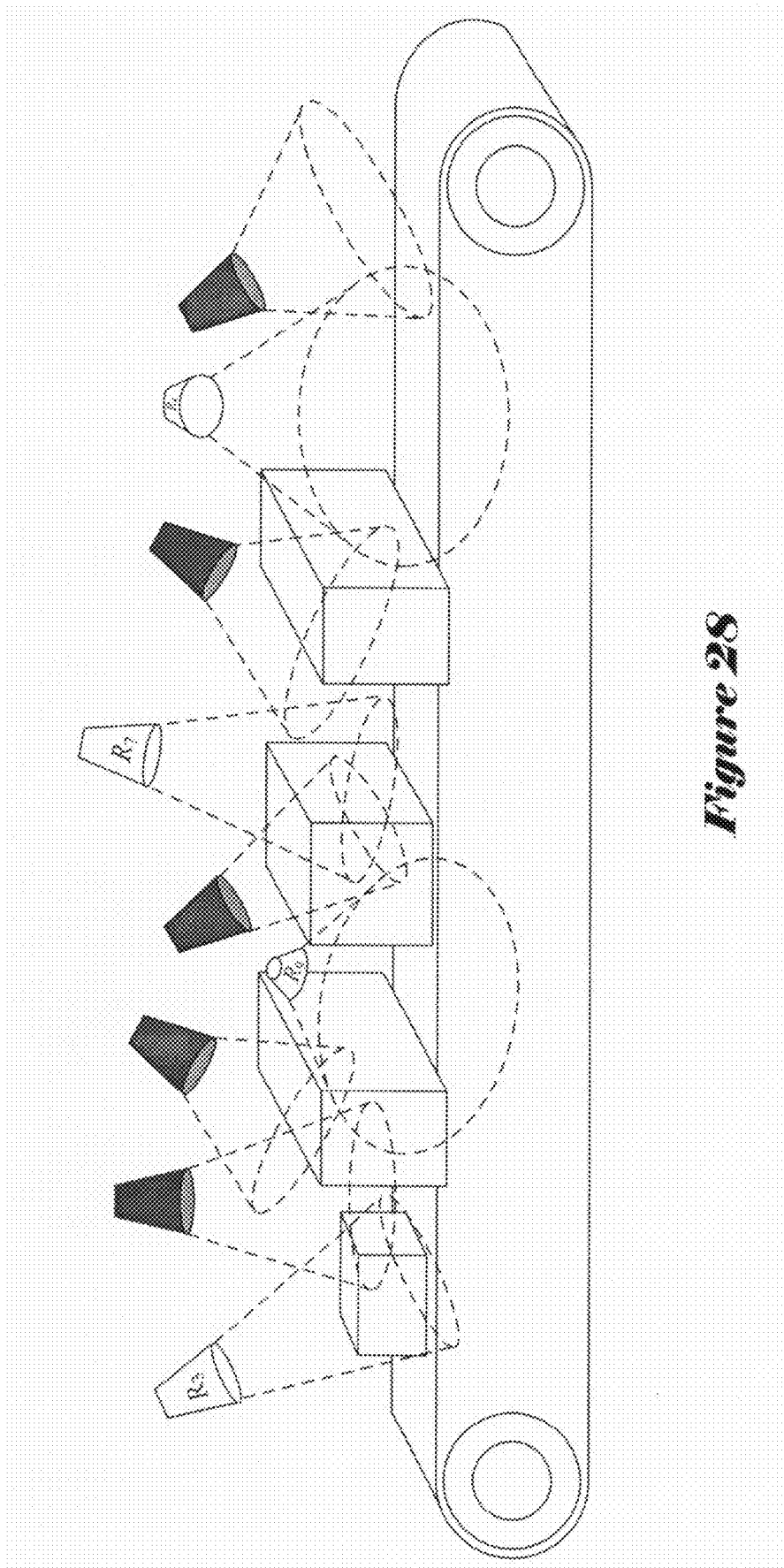
Figure 29:
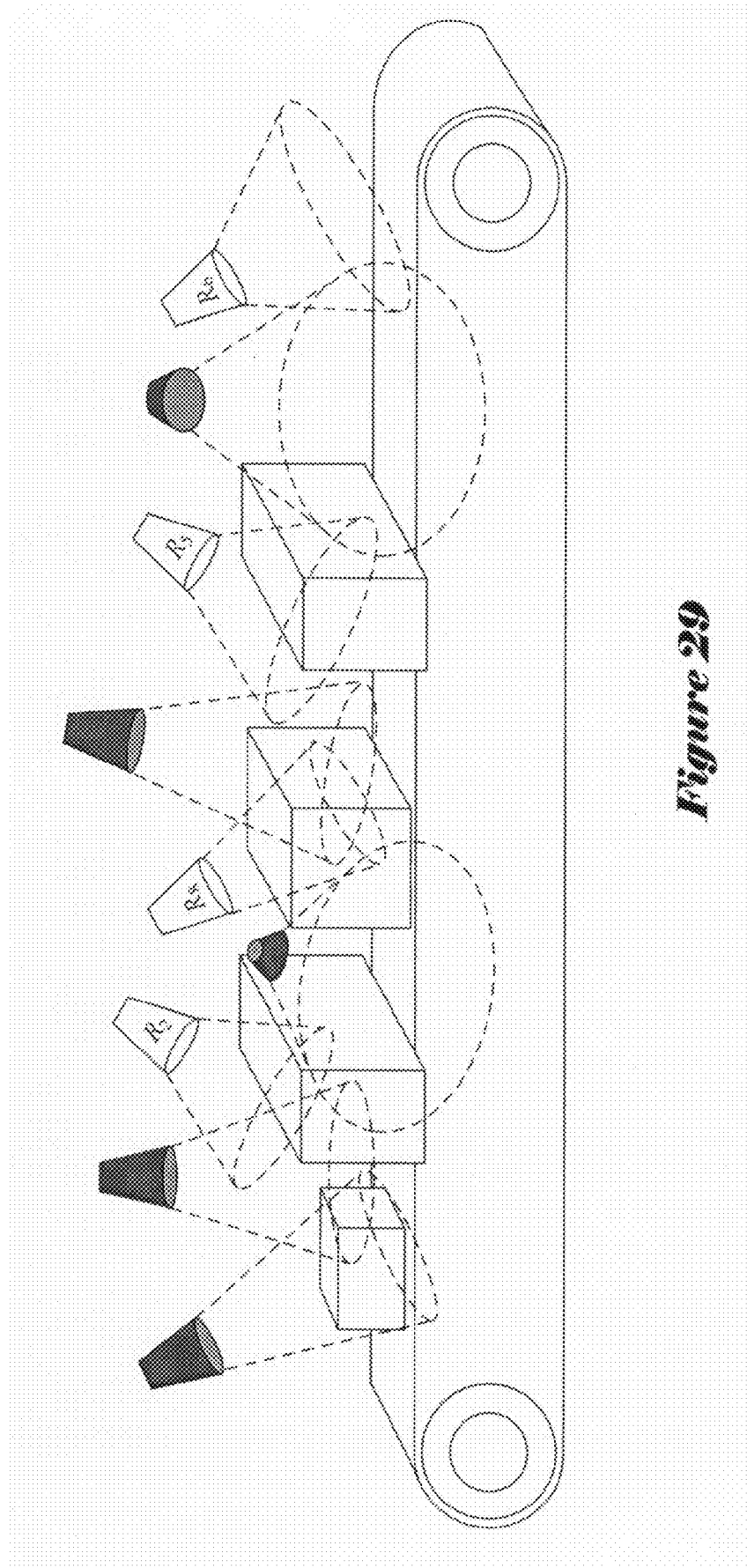

Having removed, or permanently powered down, RFID-tag reader $R_1$, a simple interrogation strategy is to alternate powering-up and powering-down of each independent subset of RFID-tag readers for equal-length periods. FIG. 28 illustrates a first period in a cycle of power-on/power-off operations of the interrogation strategy in which RFID-tag readers of independent subgroup 2702 in FIG. 27 are powered-on. FIG. 29 illustrates a second period in a cycle of power-on/power-off operations of an interrogation strategy in which RFID-tag readers of a second independent subgroup 2704 in FIG. 27 are powered-on. In FIGS. 28 and 29, powered-off RFID-tag readers are shown darkly shaded, while powered-on RFID-tag readers are shown unshaded. In both cycles, RFID-tag-reader $R_1$ is powered off. By alternating the periods shown in FIGS. 28 and 29, each RFID-tag reader is given as much time as possible without chance of collisions due to interference between pairs of RFID-tag readers. Additional factors may be considered to choose the groupings of RFID-tag readers, when multiple groupings are possible, and to choose the respective lengths of periods. For example, in the case illustrated in FIGS. 27-29, it may turn out that RFID-tag readers $R_4$, $R_7$, $R_9$, and $R_3$, all belonging to the second independent subgroup 2704 in FIG. 27, may have much higher event correlations than the RFID-tag readers in the first independent subgroup 2702 in FIG. 27. In this case, it may be prudent to power on the RFID-tag readers of the second group 2704 in FIG. 27 for a longer period of time than the RFID-tag readers of the first group 2702. In other words, in this case, the length of the second period shown in FIG. 29 may be longer than the length of the first period, shown in FIG. 28, to increase the total number of RFID tags that can be successfully interrogated by the multi-RFID-tag-reader network.

Figure 30:
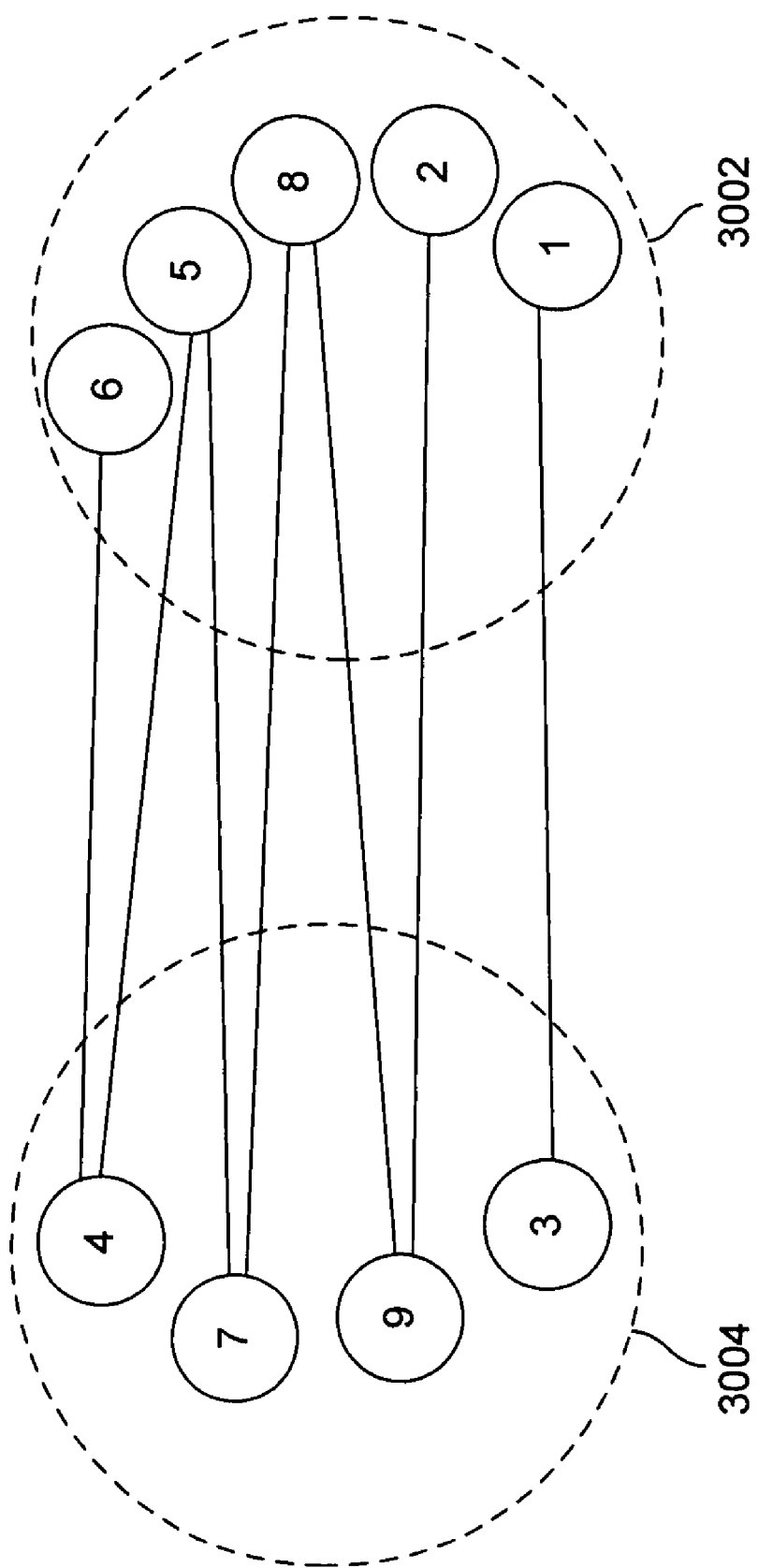
FIG. 30 shows a second approach to developing an interrogation strategy for a multi-RFID-tag-reader network that represents a second embodiment of the present invention.
Figure 31:
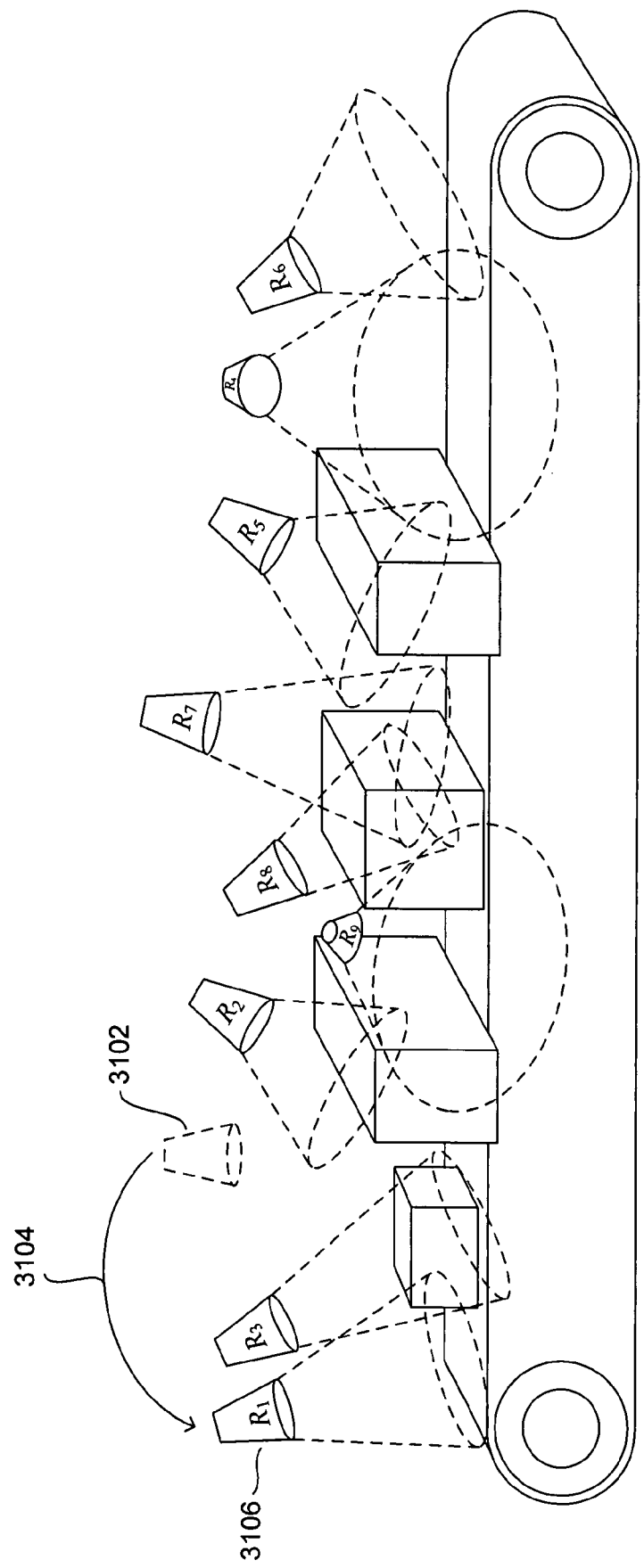
FIG. 31 illustrates a displacement of RFID-tag reader $R_1$ to a location in which interferences between RFID-tag reader $R_1$ and RFID-tag readers $R_2$ and $R_9$ are eliminated.

FIG. 30 shows a second approach to developing an interrogation strategy for a multi-RFID-tag-reader network that represents a second embodiment of the present invention. Comparing the collision graph shown in FIG. 30 with the collision graph 2602 in FIG. 26, it is observed that the 3-partite collision graph in FIG. 26 has been transformed into the bipartite collision graph shown in FIG. 30 by removing edges 2620 and 2622 from the 3-partite collision graph shown in FIG. 26. By removing edge 2622, the interference between RFID-tag-readers $R_1$ and $R_2$ is eliminated, allowing RFID-tag reader $R_1$ to be moved into the same independent subset as RFID-tag reader $R_2$. Thus, the collision graph shown in FIG. 30 includes a first, five-member independent subset 3002 and a second four-member independent subset 3004. The edge-removal perturbation illustrated by FIGS. 26 and 30 physically corresponds to moving RFID-tag reader $R_1$ to a location in which the interferences between RFID-tag reader $R_1$ and RFID-tag readers $R_2$ and $R_9$ are removed. FIG. 31 illustrates a displacement of RFID-tag reader $R_1$ to a location in which interferences between RFID-tag reader $R_1$ and RFID-tag readers $R_2$ and $R_9$ are eliminated. In FIG. 31, the original location of RFID-tag reader $R_1$ is shown by dashed lines 3102, and the displacement of RFID-tag reader $R_1$ is indicated by arrow 3104. In its new location 3106, RFID-tag reader $R_1$ is seen to interfere only with RFID-tag reader $R_3$, as indicated in the collision graph shown in FIG. 30. Having transformed the multi-RFID-tag-reader network into a network that can be modeled by a bipartite collision graph, as shown in FIG. 30, two different power-on/power-off periods, such as those illustrated in FIGS. 28 and 29, can be combined in a cycle of power-on/power-off operations to provide as much interrogation time as possible to each of the RFID-tag readers without possibility of collision due to RFID-tag readers with overlapping fields being simultaneously powered on. Edge removal can also be accomplished by changing the orientation of an RFID-tag reader, in addition to, or instead of, changing the position of the RFID-tag reader in order to remove overlaps between the RFID-tag reader's field and the fields of other RFID-tag readers in a multi-RFID-tag-reader network.

While, as discussed above, edge-removal and node-removal perturbations can be used to alter a collision graph to produce a lower-partite collision graph that models an altered multi-RFID-tag-reader network that achieves greater tag-interrogation efficiency, choosing effective or optimal perturbations is not a trivial problem. Although the present invention is described with relatively simple examples, practical situations may involve many tens or hundreds of RFID-tag readers with high degrees of overlap. In these cases, the collision graphs are relatively complex, and choosing edge-removal or node-removal operations that can be applied to lower the minimal k for which the collision graph is k-partite by a brute-force technique, such as a comprehensive state-space search, may be computationally difficult or infeasible. For this reason, methods and systems of the present invention employ computationally efficient perturbation-selection methods that represent additional embodiments of the present invention.

Figure 32A:
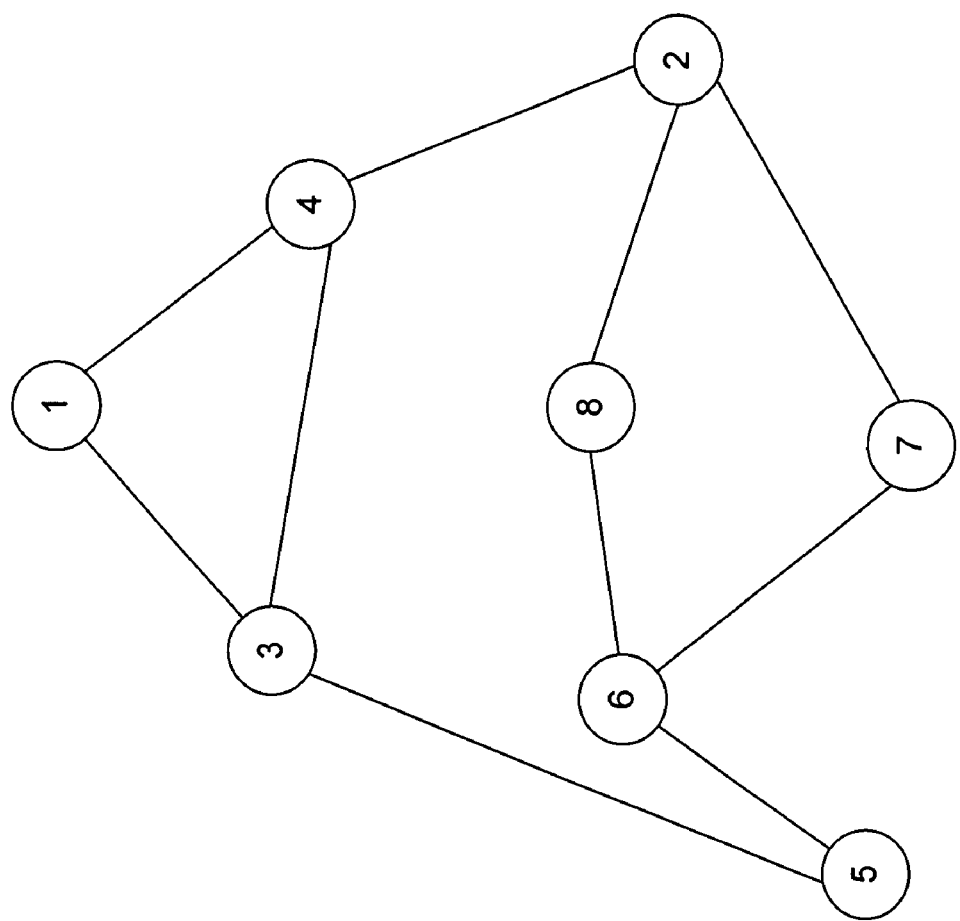
Figure 32B:
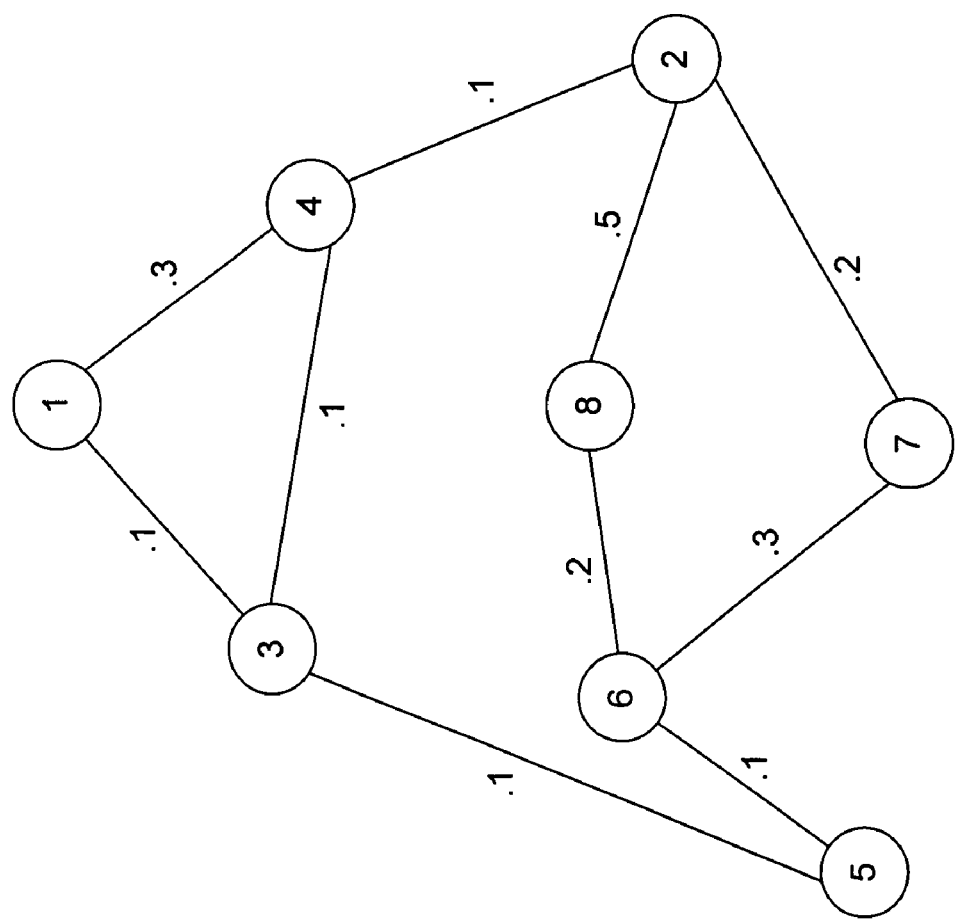
Figure 32C:
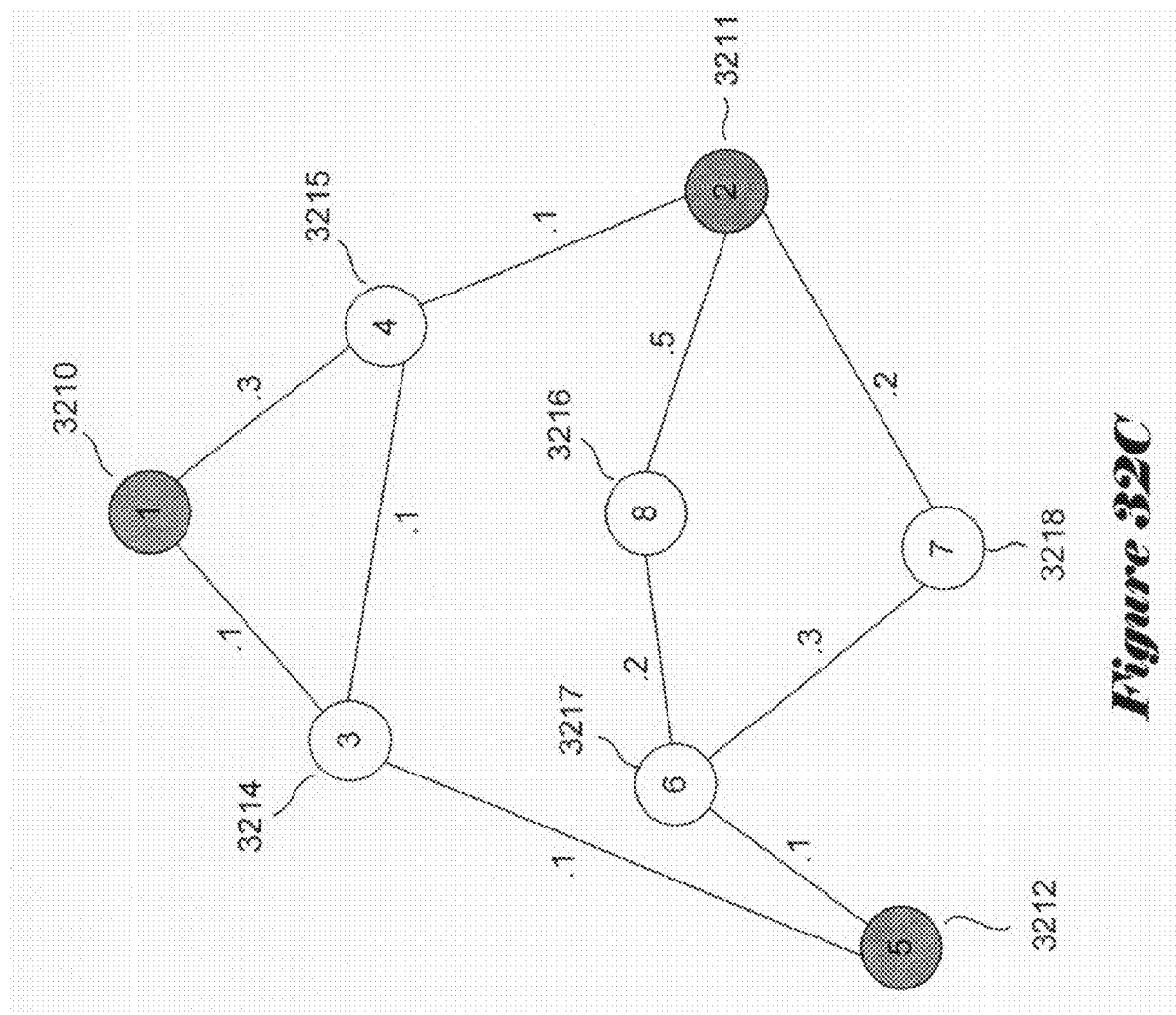

FIGS. 32A-32F illustrate the general perturbation-selection methods that represent embodiments of the present invention. First, as shown in FIG. 32A, the perturbation-selection method starts with a collision graph that models a multi-RFID-tag-reader network. Next, as shown in FIG. 32B, weights may be assigned to edges for selection of an edge-removal perturbation, to vertices for selection of node-removal perturbations, or to both edges and nodes for selection of the best of possible edge-removal and node-removal perturbations. In FIG. 32B, weights are shown assigned only to edges. Then, as shown in FIG. 32C, a coloring method is used to attempt to color the vertices within the collision graph so that no pair of vertices connected by a single edge have the same color. When seeking a bipartite, modified collision graph, two colors may be used for coloring the vertices. When seeking an n-partite collision graph, n different colors may be used. In certain cases, the coloring method may produce a desired, perfectly colored collision graph in which no pair of vertices interconnected by an edge have the same color. However, in general, the first application of a coloring method generally produces a defect set consisting of vertices colored with the last-applied color interconnected by edges to other vertices with the same, last-applied color.

Figure 32D:
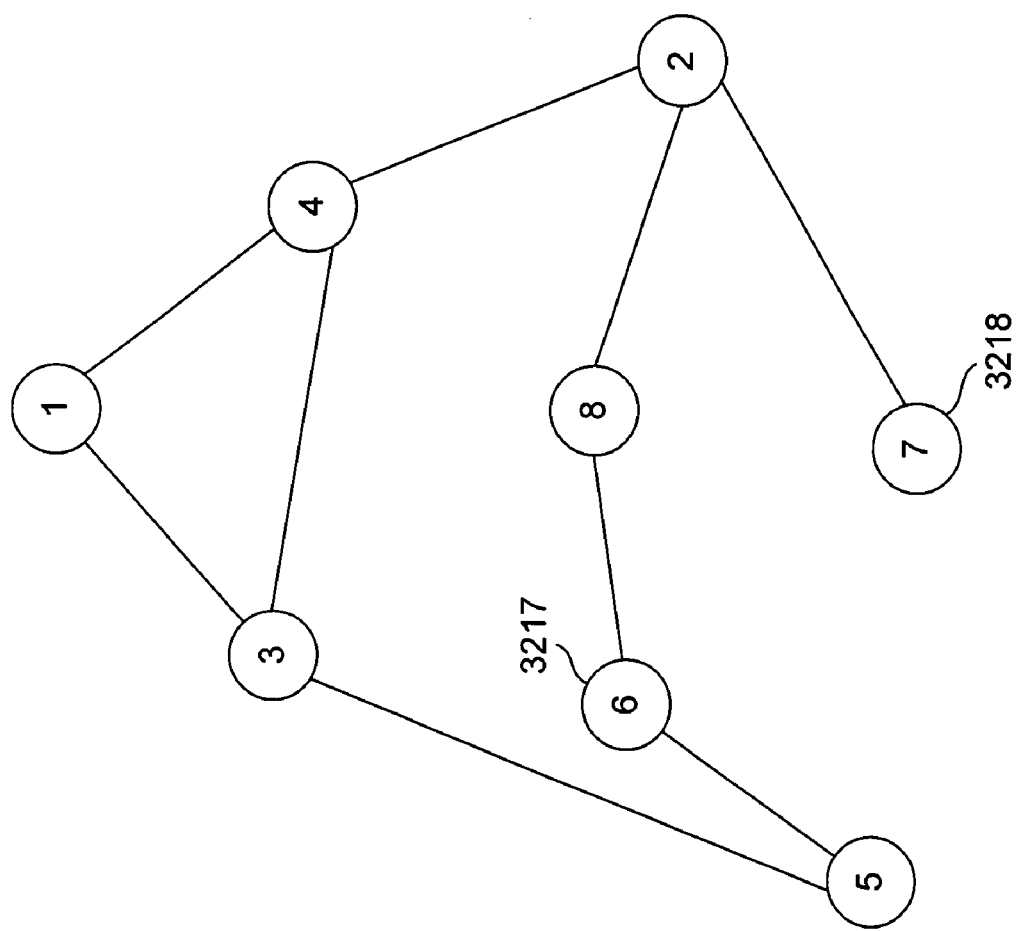

In FIG. 32C, the darkly colored nodes 3210-3212 are colored so that no pair of darkly colored nodes is interconnected by a single edge. However, the uncolored nodes 3214-3218 include pairs of nodes, such as the pairs {3214, 3215}, {3217, 3216}, and {3217, 3218} with both members of the pair of vertices lightly colored and connected by a single edge. These vertices may be considered to be defectively colored, or members of the defect set. Next, as shown in FIG. 32D, in the case of choosing an edge-removal perturbation, an edge with a largest weight of the edges that interconnect nodes within the defect set is chosen for removal. In the current case, the edge interconnecting nodes 3217 and 3218 is selected for removal, and is removed to produce the altered collision graph shown in FIG. 32D. The edge-removal perturbation selection method may then be continued by coloring the altered collision graph shown in FIG. 32D to select a next edge for removal. The process may continue until a perfect coloring is obtained in which no two vertices joined by a single edge are identically colored. At that point, the minimal k for which the collision graph is k-partite is equal to the number of colors used in the successful coloring.

In one embodiment of the present invention, weights assigned to edges are the pairwise RFID-tag-reader correlations discussed above. These correlations can be determined by testing a multi-RFID-tag reader network, such as the multi-RFID-tag-reader network shown in FIG. 21, under various conditions and for various lengths of time in order to determine reasonable approximations for pairwise RFID-tag-reader correlations under conditions expected for operation of the multi-RFID-tag-reader network.

Figure 32F:
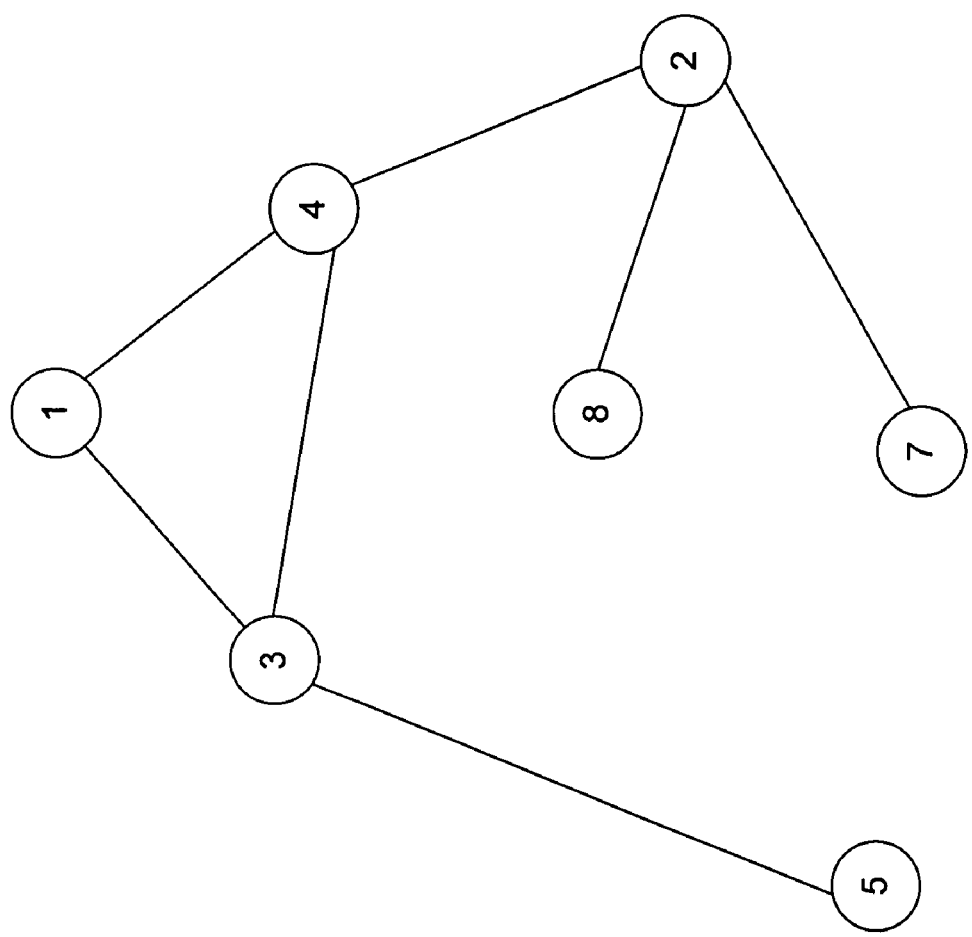

Alternatively, as shown in FIG. 32E, weights may be assigned to nodes, and the collision graph colored in order to identify a defect set of nodes, rather than edges. Then, as shown in FIG. 32F, the defect-set node, from among the defect-set nodes with greatest degree, having the lowest weight may be removed. In FIG. 32F, node 3217 of FIG. 32E has been removed to produce an altered collision graph. As with the edge-removal method, the node-removal-perturbation-selection method may continue with additional coloring and node-removal steps in order to produce a properly colored collision graph. In alternative embodiments, both edges and nodes may be weighted, and a metric may be applied to all possible edge-removal and node-removal perturbations in order to select a perturbation during each iteration of an iterative perturbation-based method for producing a collision graph with a desired minimal k for which the collision graph is k-partite. In one embodiment of the present invention, weights assigned to nodes may be the event correlations for the corresponding RFID-tag readers. In alternative embodiments, other weighting schemes may be applied.

Figure 33A:
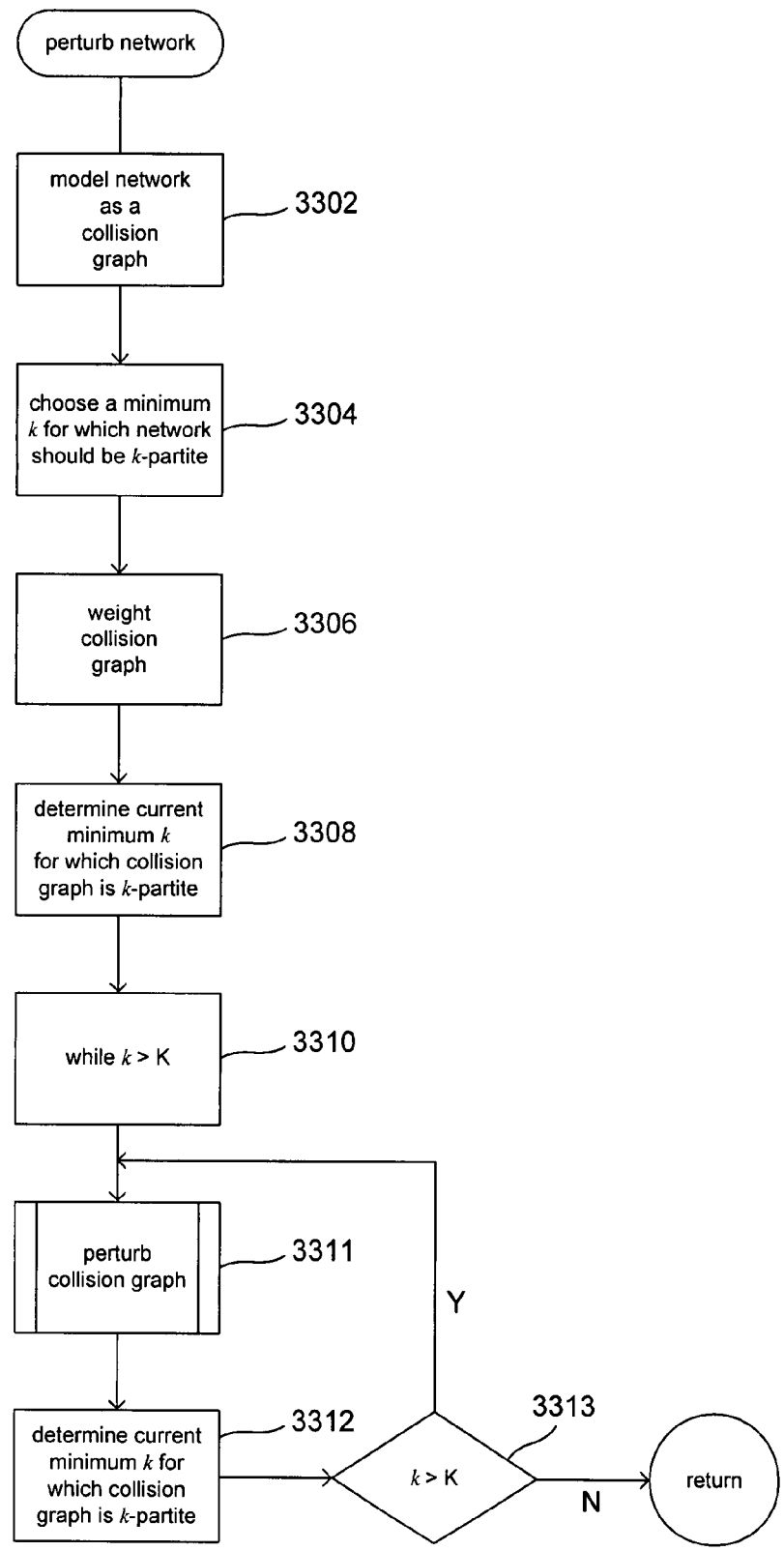
FIGS. 33A-B provide a control-flow-diagram illustration of one method embodiment of the present invention.
Figure 33B:
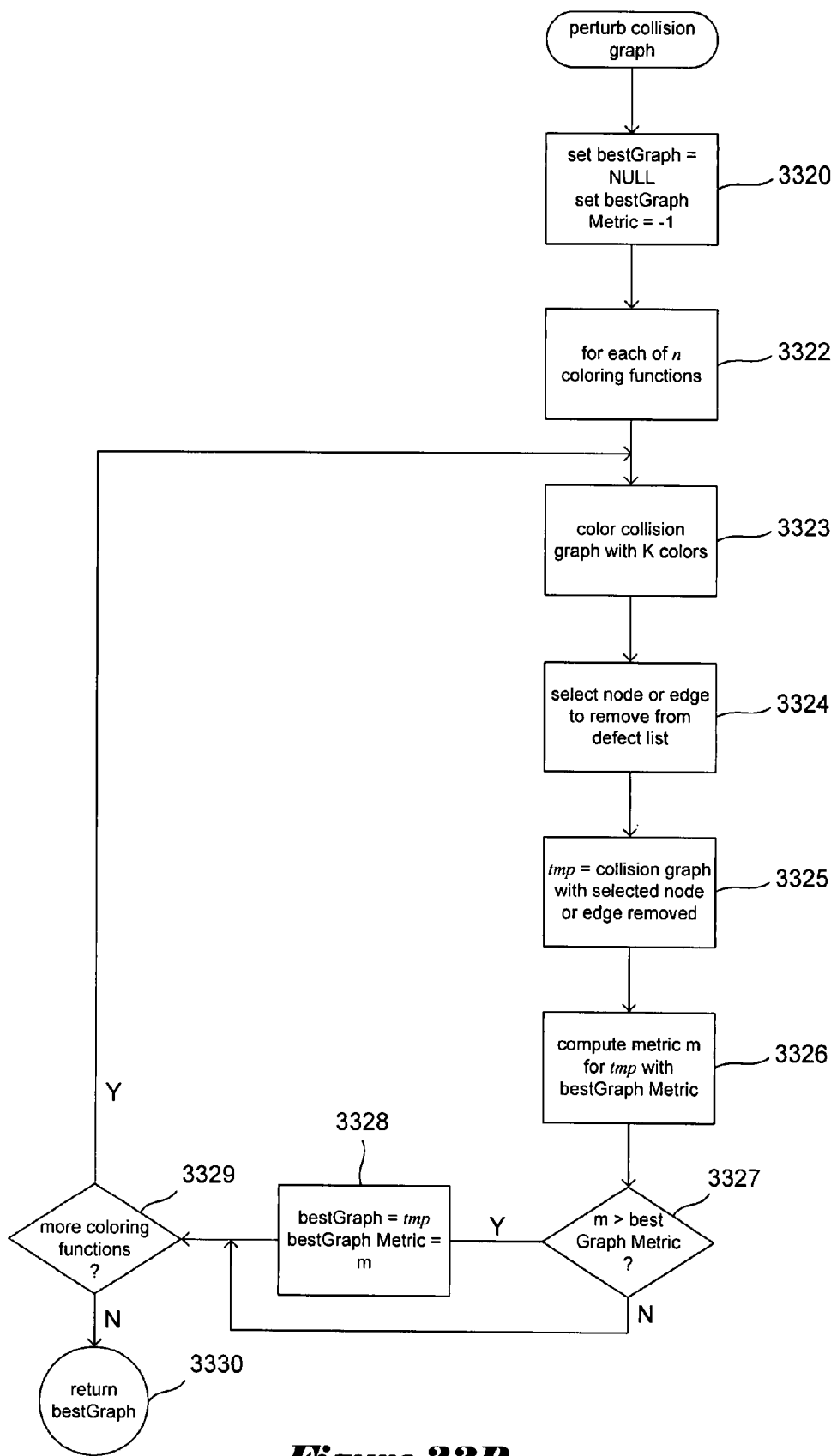

FIGS. 33A-B provide a control-flow-diagram illustration of one method embodiment of the present invention. FIG. 33A shows a control-flow diagram of a routine "perturb network" that applies perturbations to an initial collision-graph model of a multi-RFID-tag-reader network until the multi-RFID-tag-reader network has a desired minimum K for which the multi-RFID-tag-reader network is k-partite. In step 3302, the routine "perturb network" creates a collision graph to model a multi-RFID-tag-reader network. In step 3304, the routine "perturb network" chooses a desired minimum K for which the desired multi-RFID-tag-reader network should be k-partite. Selecting a desired K involves ascertaining a K that balances the computational effort in altering the collision graph to obtain the K, the possible reduction in interrogation efficiency that may result from applying perturbations, and the interrogation efficiency that can be achieved by reducing K, among other criteria. Next, in step 3306, the routine "perturb network" weights the collision graph, as discussed above, by one of many possible weighting schemes. Then, in step 3308, the routine "perturb network" uses a coloring method to determine the current minimum k for which the collision graph is k-partite. In the while-loop of steps 3310-3313, the routine "perturb network" continues to select and apply perturbations, via a call to the routine "perturb collision graph," until the current minimum k for which the collision graph is k-partite is less than or equal to K.

FIG. 33B shows a control-flow diagram of a routine "perturb collision," called in step 3311 of the routine "perturb network," shown in FIG. 33A, that selects and applies a perturbation to a collision-graph. In step 3320, the routine "perturb collision graph" sets a pointer to a best, next collision graph, bestGraph, to NULL, and sets the value of a local variable bestGraphMetric to −1. In the for-loop of steps 3322-3329, the routine "perturb collision graph" iteratively colors the collision graph to be perturbed using different coloring functions, selects a perturbation from the defect set, as discussed above, and applies the perturbation to generate a next perturbed candidate collision graph. After applying all the coloring functions, the routine "perturb collision graph" selects the perturbed candidate collision graph with a greatest metric to return. The metric may be any of the above-discussed or subsequently discussed criteria for evaluating a perturbed collision graph to choose a best, next perturbation. In step 3323, the routine "perturb collision graph" colors the collision graph with K colors. In step 3324, the routine "perturb collision graph" selects a next perturbation from the defect set of the colored collision graph. Any of many different criteria can be used to select the perturbation, as discussed above, and as discussed in the following subsection. In step 3325, the routine "perturb collision graph" applies the selected perturbation, and in step 3326, the routine "perturb collision graph" computes a metric m for the perturbed, candidate collision graph. When m is greater than bestGraphMetric, as determined in step 3327, the routine "perturb collision graph" notes the fact that the current perturbed candidate collision graph is the best so far generated by updating bestGraph to point to the current perturbed candidate collision graph. Once all coloring functions have been applied, the routine "perturb collision graph" returns the perturbed collision graph reference by bextGraph, in step 330. In practical implementations, the series of selected perturbations may be recorded, to generate a procedure for modifying the multi-RFID-tag-reader network.

C++-Like Pseudocode Implementation of One Embodiment of the Present Invention

A C++-like pseudocode implementation of a method embodiment of the present invention is next provided:

```
1   typedef Perturbance;
2   typedef WeightingConditions;
3   typedef *Node;
4   typedef bool (*COLOR)(int k, graph* g);
5   const int PMAX;
6   class graph
7   {
8     private:
9       Perturbance ps[PMAX];
10      int nextP;
11    public:
12      graph& operator= (graph g);
13      bool addNode (Node* n);
14      bool deleteNode (Node* n);
15      bool addEdge (Node* n1, Node* n2);
16      bool deleteEdge (Node* n1, Node* n2);
17      void clear( );
18      void weight (WeightingConditions* wc);
19      Perturbance perturb( );
20      int compare (graph g);
21      void k_tize(int k, WeightingConditions* wc,
22             COLOR* cFunctions, int numCFunctions);
23      Perturbance* getFirstP( );
24      Perturbance* getNextP( );
25      void display( );
26      graph( );
27  };
28  void graph::k_tize(int k, WeightingConditions* wc, COLOR*
29             cFunctions, int numCFunctions)
30  {
31    int i;
32    bool finished = false;
33    bool tmp;
34    graph bestG, testG;
35    Perturbance bestP = 0, testP;
36
37    weight(wc);
38    while (!finished)
39    {
40        bestG = *this;
41        for (i = 0; i < numCFunctions; i++)
42        {
43            testG = *this;
44            tmp = (*cFunctions[i])(k, &testG);
45            if(!tmp) testP = testG.perturb( );
46            if (testG.compare(bestG))
47            {
48                bestG = testG;
49                bestP = testP;
50            }
51            finished = finished || tmp;
52        }
53        *this = bestG;
54        ps[nextP++] = bestP;
55    }
56  }
```

On lines 1-4 of the above C++-like pseudocode, four type definitions are provided. The first three type definitions are incomplete, because the actual data structures or classes used for the data types are implementation specific. The first three type definitions include: (1) Perturbance, a structure or class that describes a node-deletion or edge-deletion perturbance of a collision graph; (2) WeightingConditions, a structure or class that includes sufficient information to assign weights to nodes, edges, or both nodes and edges of a collision graph, as discussed above; and (3) Node, a structure or class that describes a node of a collision graph. The fourth type definition, on line 4, defines a class of functions, COLOR, that each attempts to color the vertices of a graph with k colors, as described above, returning a Boolean value indicating whether or not a perfect coloring is obtained. On line 5, a constant PMAX is declared for the size of a buffer storing perturbances in instances of the class graph, discussed below. No explicit value for PMAX is provided in the pseudocode, since the specific value is implementation specific.

Next, on lines 6-27, the class graph is declared. An instance of the class graph represents a collision graph, discussed above with reference to FIGS. 26-27, 30, and 32A-32E. On lines 9-10, a private array of Perturbance objects, ps, and an index into the array of Perturbance object, nextP, are declared. On lines 12-16, a number of function members of the class graph are declared, including an assignment operator for copying the contents of one instance of the graph class to another instance of the graph class as well as function members for adding and deleting nodes and edges from the collision graph. These functions are representative of general function members for editing, traversing, and manipulating graphs, not all of which are included in the pseudocode. On line 17, a function member clear is declared which clears any previously applied weights. On line 18, the function member weight is declared. The function member weight uses weighting conditions supplied by pointer argument wc to weight the nodes, edges, or nodes and edges of the collision graph as described above. On line 19, the function member perturb is declared. The function member perturb chooses a best perturbation from among possible perturbations to apply to the collision graph. In some implementations, the function member perturb may select only a node-removal perturbation, in other implementations the function member perturb may select only an edge-removal perturbation, and in yet alternative implementations, the function member perturb may either an edge-removal or a node-removal operation, or even additional types of perturbations of a collision graph. On line 20, the function member compare is declared. The function member compare compares a graph supplied as argument g to the current instance of the class graph, using a metric or metric function, to determine whether or not the current instance of the class graph is more desirable than the graph g. For example, during a sequence of edge-removal operations leading to a k-partite collision graph, a graph with the lowest edge-weight sum may be most desirable. Many other metrics and metric functions may be applied by the function member compare. On line 21, the function member k_tize is declared. The function member k_tize iteratively colors the collision graph represented by the current instance of the class graph, chooses a next perturbation, and applies the next perturbation until the collision graph is k-partite. Thus, the function member k_tize represents one method embodiment of the present invention. On lines 23-24, the function members getFirstP and getNextP are declared. These functions allow all perturbances stored in the array ps to be retrieved. On line 25, a function member display is declared to allow the contents of the collision graph to be rendered for inspection or for use by other classes and routines. Finally, on line 26, a constructor for the class graph is provided, although without implementation-specific details.

On lines 28-56, an implementation for the function member k_tize is provided. The function member k_tize receives the following arguments: (1) k, the desired minimal k for which the collision graph is k-partite; (2) wc, weighting conditions to be applied to the collision graph; (3) cfunctions, an array of coloring functions to be applied to the collision graph; and (4) numCFunctions, the number of coloring functions in the array CFunctions. On lines 31-35, a number of local variables are declared, including two local graph objects bestG and testG on line 34. On lines 37, the function member weight is called to weight the collision graph represented by the current instance of class graph.

Next, in the while-loop of lines 38-56, perturbations are selected and applied to the collision graph until the collision graph is k-partite, where k is the supplied argument k. On line 40, the local graph bestG is assigned to the current value of the graph represented by the current instance of the class graph. Then, in the for-loop of lines 41-52, the coloring functions are applied, on line 44, one perfor-loop iteration, to the current state of the collision graph represented by the instance of the class graph, copied into testG on line 43. A next perturbation is selected and applied to testG, on line 45, when the coloring is not perfect. When local graph testG is more desirable than local graph bestG, as determined on line 46, the local graph testG is copied into local graph bestG, and the perturbance applied to testG is copied from local variable testP into local variable bestP. At the end of each iteration of the for-loop, the local Boolean variable finished is updated, on line 51, to reflect whether or not a perfect coloring has been obtained by application of any of the coloring functions. Following completion of the for-loop, the collision graph represented by the current instance of class graph is updated to the perturbed, or altered, collision graph, stored in local variable bestG, on line 53, and the perturbance that generated bestG is stored in a next, sequential position of the perturbance array ps. When the while-loop of lines 38-56 completes, the private array ps stores a sequence of perturbations that can be applied to produce the k-partite collision graph. These perturbations can be extracted from an instance of the class graph to direct alteration of a multi-RFID-tag-reader network to produce a multi-RFID-tag-reader network with a desired, minimal independent-subset partition for which efficient interrogation strategies may be developed, such as a cycle of power-on/power-off operations, as discussed in the previous subsection.

Although the present invention has been described in terms of particular embodiments, it is not intended that the invention be limited to this embodiment. Modifications within the spirit of the invention will be apparent to those skilled in the art. For example, as discussed above, many different weighting functions, metrics for selecting most desirable next perturbations, coloring functions, and other such methods and functions employed in the method embodied by the routine k_tize may be used in alternative embodiments. In addition, many additional criteria may be embodied in weights applied to nodes, edges, or both nodes and edges of collision graphs in order to facilitate selection of the best perturbations. For example, weights may be used to steer collision-graph alterations to produce collision graphs with k-different independent subsets that have various different properties. It may be desirable to place RFID-tag-readers with the largest event correlations in one partition, and RFID-tag-readers with lower event correlations in a different partition, so that the high event correlation RFID-tag readers with high event correlations can be given longer power-on cycles to increase the sufficiency of the multi-RFID-tag-reader network. An almost limitless number of implementations of the method embodied in the above-described routine k_tize are possible, using different control structures, data structures, modular organizations, and by varying other programming parameters. The method embodiments of the present invention may be incorporated into an automated system that continuously monitors and adjusts a multi-RFID-tag-reader network in order to track changing conditions and optimize the multi-RFID-tag-reader network for interrogation efficiency. For example, a multi-RFID-tag-reader network may be controlled by a controller or computer system that embodies the method embodiments of the present invention in logic circuits and/or firmware, or in software, respectively, to increase interrogation efficiency of the multi-RFID-tag-reader network by modeling the multi-RFID-tag-reader network as a collision graph and adjusting the multi-RFID-tag-reader network configuration by adjusting positions and/or orientations of RFID-tag readers or by powering off RFID-tag readers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for configuring a multi-RFID-tag-reader network, the method comprising:
   modeling the multi-RFID-tag network as a collision graph;
   selecting a desired k number of independent subgroups of RFID-tag readers;
   iteratively
      coloring the collision graph,
      selecting a next perturbation from a defect set resulting from coloring the collision graph, and
      modifying the collision graph by applying the selected next perturbation until the collision graph is k-partite; and
   employing the k-partite collision graph to design an efficient interrogation strategy for the RFID-tag readers of the multi-RFID-tag-reader network.

2. The method of claim 1 wherein the collision graph includes nodes, each node representing an RFID-tag reader, and edges, each edge representing an interference between the RFID-tag readers represented by two nodes connected by the edge.

3. The method of claim 1 wherein coloring the collision graph further comprises attempting to assign one of k colors to each node in the collision graph so that no two nodes connected by a single edge have an identical, assigned color.

4. The method of claim 1 wherein the defect set is a set of nodes of a particular color that are connected to other nodes of an identical color by a single edge.

5. The method of claim 1 wherein a perturbation may include:
   removal of an edge; or
   removal of a node.

6. The method of claim 1 wherein employing the k-partite collision graph to design an efficient interrogation strategy for the RFID-tag readers of the multi-RFID-tag-reader network further comprises:
   designing a cycle of power-on/power-off periods, during each power-on/power-off period of which RFID-tag readers represented by an independent subset of collision-graph nodes is powered on, and all other RFID-tag readers are powered off.

7. The method of claim 1 wherein selecting a desired k number of independent subgroups of RFID-tag readers further includes:
   when RFID-tag readers within the multi-FRID-tag-reader network are highly correlated with one another, selecting a low-valued k; and
   when RFID-tag readers within he multi-FRID-tag-reader network are not strongly correlated with one another, selecting a k that balances decreasing the number of partitions k with computational efficiency and with need to remove or relocate as few RFID-tag readers as possible.

8. A system for increasing the interrogation efficiency of a multi-RFID-tag-reader network, the system comprising:
   a controller or computer system that controls powering on and powering off of RFID-tag readers as well as positions and/or orientations of RFID-tag readers within the RFID-tag-reader network; and
   logic executed by the controller or computer system, that models the multi-RFID-tag-reader network as a collision graph and that chooses perturbations to apply to the multi-RFID-tag-reader network in order to increase the interrogation efficiency of the multi-RFID-tag-reader network.

9. The system of claim 8 wherein perturbations include:
   removing an RFID-tag reader from a power-on/power-off cycle in order to remove one or more interferences between the RFID-tag reader and one or more other RFID-tag readers of the multi-RFID-tag-reader network; and
   repositioning, reorienting, or both repositioning and reorienting an RFID-tag reader with respect to other RFID-tag readers in the multi-RFID-tag-reader network in order to remove one or more interferences between the RFID-tag reader and one or more other RFID-tag readers of the multi-RFID-tag-reader network.

10. The system of claim 8 wherein the logic executed by the controller or computer system that models the multi-RFID-tag-reader network as a collision graph and that chooses perturbations to apply to the multi-RFID-tag-reader network in order to increase the interrogation efficiency of the multi-REID-tag-reader network continues to select and apply perturbations until the collision graph is k-partite.

11. The system of claim 10 where k is selected by the logic to balance computational overhead of perturbation selection and application, powering on as many RFID-tag readers with low correlations with other RFID-tag readers as possible, and obtaining as great an interrogation efficiency as possible.

12. The system of claim 11 wherein the logic selects perturbations based on weights assigned to collision-graph edges and nodes, as well as collision-graph-node degrees.

13. The system of claim 12 wherein the weight assigned to a collision-graph edge is proportional to a correlation between the two RFID-tag readers represented by the two collision-graph nodes connected by the edge, with edges of greater weight removed in preference to edges with smaller weights.

14. The system of claim 12 wherein the weight assigned to a collision-graph node is proportional to a correlation of the RFID-tag reader represented by the node and an event comprising interrogation of RFID tags that pass through the RFID-tag-reader's field, with collision-graph nodes of greatest degree and lowest weight favored for powering off.

15. A method for configuring a multi-RFID-tag-reader network, the method comprising:
   modeling the multi-RFID-tag network as a collision graph, the collision graph including nodes, each node representing an RFID-tag reader, and edges, each edge, representing an interference between the RFID-tag readers represented by the nodes connected by the edge;
   selecting a desired k number of independent subgroups of RFID-tag readers; and
   selecting and applying perturbations that alter the collision graph model and multi-MD-tag network to increase an interrogation efficiency of the multi-RFID-tag-reader network until the collision graph is k-partite by
      coloring the collision graph by attempting to assign one of k colors to each node in the collision graph so that no two nodes connected by a single'edge have an identical, assigned color, and
      selecting a next perturbation from a defect set resulting from coloring the collision graph, the defect set comprising a set of nodes of a particular color that are connected to other nodes of an identical color by a single edge.

16. The method of claim 15 wherein a perturbation may include:
   removal of an edge; or
   removal of a node.

17. The method of claim 16 wherein weights are assigned to collision-graph edges and nodes, the weight assigned to a collision-graph edge proportional to a correlation between the RFID-tag readers represented by the collision-graph nodes connected by the edge, and the weight assigned to a collision-graph node proportional to a correlation of the RFID-tag reader represented by the node and an event comprising interrogation of RFID tags that pass through the RFID-tag-reader's field.

18. The method of claim 17 wherein selecting a perturbation that alters the collision graph model and multi-RFID-tag network to increase an interrogation efficiency of the multi-RFID-tag-reader further includes selecting to remove an edge with a greatest weight that connects a node in the defect set to another node.

19. The method of claim 17 wherein selecting a perturbation that alters the collision graph model and multi-RFID-tag network to increase an interrogation efficiency of the multi-RFID-tag-reader further includes selecting to remove a node in the defect set with a greatest degree and with a smallest weight.

20. Computer instructions stored in a computer-readable memory that implement a method for configuring a multi-RFID-tag-reader network by:
   modeling the multi-RFID-tag network as a collision graph; and
   selecting and applying perturbations that alter the collision graph model and multi-RFID-tag network to increase an interrogation efficiency of the multi-RFID-tag-reader network.

* * * * *

UNITED STATES PATENT AND TRADEMARK OFFICE
CERTIFICATE OF CORRECTION

PATENT NO.        : 8,052,055 B2                                   Page 1 of 1
APPLICATION NO.   : 11/701225
DATED             : November 8, 2011
INVENTOR(S)       : Vinay Deoalikar et al.

It is certified that error appears in the above-identified patent and that said Letters Patent is hereby corrected as shown below:

In column 19, line 55, in Claim 7, delete "FRID" and insert -- RFID --, therefor.

In column 19, line 58, in Claim 7, delete "he" and insert -- the --, therefor.

In column 19, line 58, in Claim 7, delete "FRID" and insert -- RFID --, therefor.

In column 19, line 61, in Claim 7, delete "with need" and insert -- with a need --, therefor.

In column 20, line 3, in Claim 8, delete "system," and insert -- system --, therefor.

In column 20, line 27, in Claim 10, delete "REID" and insert -- RFID --, therefor.

In column 20, line 53, in Claim 15, delete "edge," and insert -- edge --, therefor.

In column 20, line 59, in Claim 15, delete "MD" and insert -- RFID --, therefor.

In column 20, line 64, in Claim 15, delete "single'edge" and insert -- single edge --, therefor.

Signed and Sealed this
Fourteenth Day of August, 2012

David J. Kappos
*Director of the United States Patent and Trademark Office*